US012724828B1

(12) United States Patent
Schmitt et al.

(10) Patent No.: US 12,724,828 B1

(45) Date of Patent: Sep. 1, 2026

(54) APPARATUS FOR AND METHOD OF GENERATING AN INTERACTIVE DASHBOARD

(71) Applicant: Longevity Strategists, Inc., Falls Church, VA (US)

(72) Inventors: Suzanne Schmitt, Summerville, SC (US); Jennifer Late, Tysons, VA (US); Tom West, Falls Church, VA (US); Eli Wood, Boulder, CO (US); Keith Pattison, Boulder, CO (US); Bobby Nicholson, Austin, TX (US)

(73) Assignee: Longevity Strategists, Inc., Falls Church, VA (US)

( * ) Notice: Subject to any disclaimer, the term of this patent is extended or adjusted under 35 U.S.C. 154(b) by 0 days.

(21) Appl. No.: 19/423,090

(22) Filed: Dec. 17, 2025

(51) Int. Cl.
*G06F 16/901* (2019.01)
*G06F 3/0486* (2013.01)
*G06F 16/906* (2019.01)

(52) U.S. Cl.
CPC ........ *G06F 16/9027* (2019.01); *G06F 3/0486* (2013.01); *G06F 16/906* (2019.01)

(58) Field of Classification Search
CPC . G06F 16/9024; G06F 16/906; G06F 16/9027
USPC .......................................................... 707/797
See application file for complete search history.

(56) References Cited

U.S. PATENT DOCUMENTS 10,489,457 B1 * 11/2019 Wulf .................... G06Q 10/107
11,687,438 B1 * 6/2023 Torbett ................ G06F 11/3428 702/186
12,541,555 B2 * 2/2026 Vadapandeshwara ........................ G06F 16/9024
2018/0032216 A1 2/2018 Naous
2019/0363959 A1 * 11/2019 Rice ..................... G06Q 10/107
2021/0342344 A1 11/2021 Kowolenko et al.
2023/0237096 A1 7/2023 Bullard et al.

* cited by examiner

*Primary Examiner* — Hung T Vy
(74) *Attorney, Agent, or Firm* — Caldwell LLC

(57) ABSTRACT

An apparatus and method for generating an interactive dashboard. The apparatus includes at least a processor and a memory communicatively connected to the at least a processor. The memory instructs the processor to receive input data comprising a user profile associated with a user, generate, using a machine learning model, a structured network as a function of the input data. The structured network comprises a plurality of nodes with each node associated with an entity of a plurality of entities. Generating the structured network comprises classifying each node into one or more categories as a function of feature vectors extracted from the input data and entity parameters representing interconnections among the plurality of entities, assigning each node to one or more tasks as a function of the classification, and updating the assignment as a function of supplemental data. An interactive dashboard comprising the structured network is generated.

20 Claims, 9 Drawing Sheets

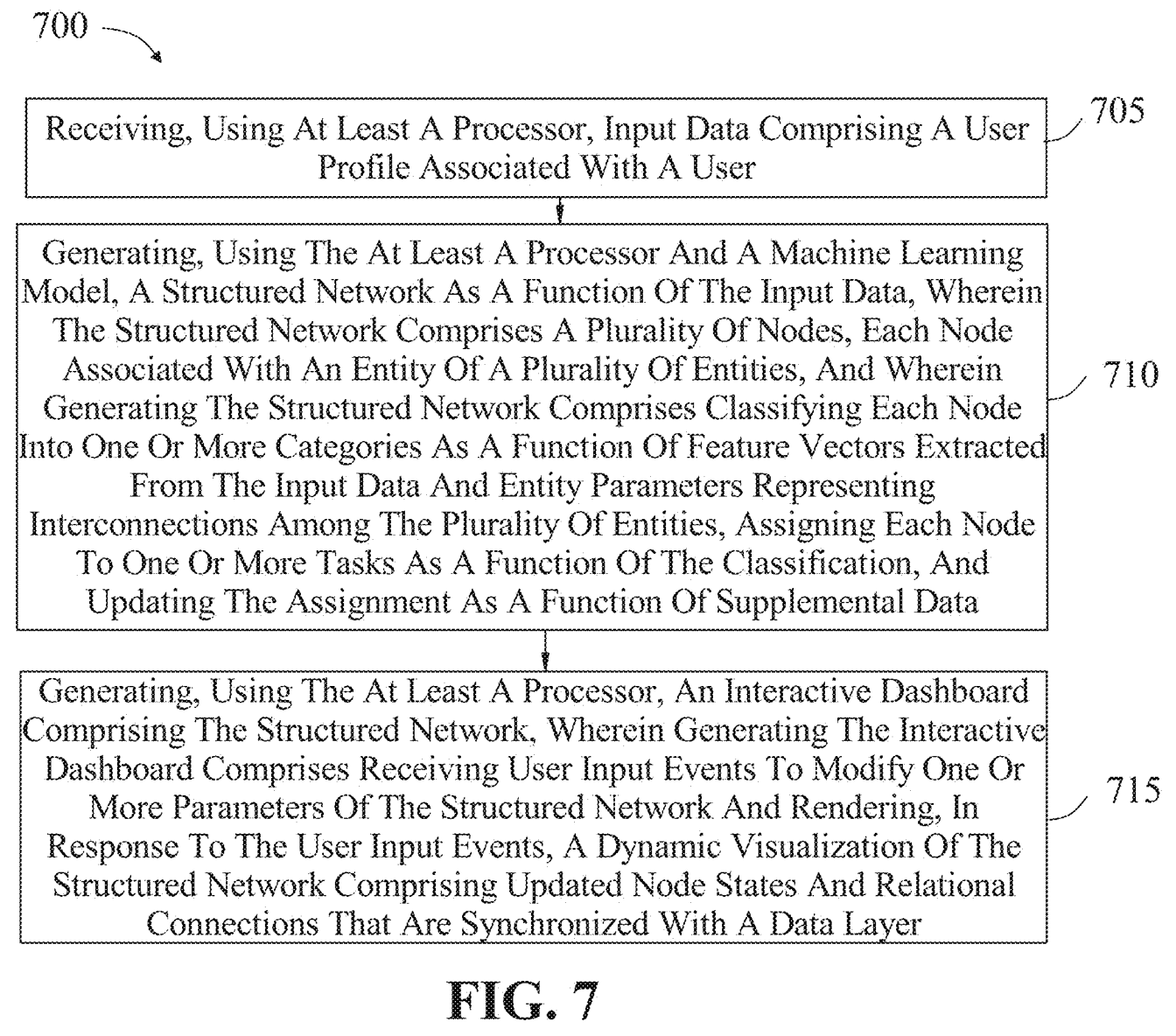

700

705: Receiving, Using At Least A Processor, Input Data Comprising A User Profile Associated With A User 710: Generating, Using The At Least A Processor And A Machine Learning Model, A Structured Network As A Function Of The Input Data, Wherein The Structured Network Comprises A Plurality Of Nodes, Each Node Associated With An Entity Of A Plurality Of Entities, And Wherein Generating The Structured Network Comprises Classifying Each Node Into One Or More Categories As A Function Of Feature Vectors Extracted From The Input Data And Entity Parameters Representing Interconnections Among The Plurality Of Entities, Assigning Each Node To One Or More Tasks As A Function Of The Classification, And Updating The Assignment As A Function Of Supplemental Data 715: Generating, Using The At Least A Processor, An Interactive Dashboard Comprising The Structured Network, Wherein Generating The Interactive Dashboard Comprises Receiving User Input Events To Modify One Or More Parameters Of The Structured Network And Rendering, In Response To The User Input Events, A Dynamic Visualization Of The Structured Network Comprising Updated Node States And Relational Connections That Are Synchronized With A Data Layer

FIG. 7

APPARATUS FOR AND METHOD OF GENERATING AN INTERACTIVE DASHBOARD

FIELD OF THE INVENTION

The present invention generally relates to the field of artificial intelligence ("AI") leveraged user interfaces. In particular, the present invention is directed to an apparatus for and a method of generating an interactive dashboard.

BACKGROUND

Today, computing devices are capable of receiving and displaying data but are often limited in representing relationships among multiple entities in a structured format. Existing systems typically present information as isolated records rather than dynamically connected nodes that reflect real-world associations. As a result, updates to one element often fail to influence related elements or parameters, causing inconsistencies and requiring repeated user input to maintain accuracy within the dataset.

SUMMARY OF THE DISCLOSURE

In an aspect, an apparatus for generating an interactive dashboard includes at least a processor and a memory communicatively connected to the at least a processor. The memory contains instructions configuring the processor to receive input data comprising a user profile associated with a user, generate, using a machine learning model, a structured network as a function of the input data, wherein the structured network comprises a plurality of nodes, each node associated with an entity of a plurality of entities, wherein generating the structured network comprises classifying each node into one or more categories as a function of feature vectors extracted from the input data and entity parameters representing interconnections among the plurality of entities, assigning each node to one or more tasks as a function of the classification, and updating the assignment as a function of supplemental data, and generate an interactive dashboard comprising the structured network, wherein generating the interactive dashboard comprises receiving user input events to modify one or more parameters of the structured network, and rendering, in response to the user input events, a dynamic visualization of the structured network comprising updated node states and relational connections that are synchronized with a data layer.

In another aspect, a method of generating an interactive dashboard includes receiving, using at least a processor, input data comprising a user profile associated with a user, generating, using the at least a processor and a machine learning model, a structured network as a function of the input data, wherein the structured network comprises a plurality of nodes, each node associated with an entity of a plurality of entities, and wherein generating the structured network comprises classifying each node into one or more categories as a function of feature vectors extracted from the input data and entity parameters representing interconnections among the plurality of entities, assigning each node to one or more tasks as a function of the classification, and updating the assignment as a function of supplemental data, and generating, using the at least a processor, an interactive dashboard comprising the structured network, wherein generating the interactive dashboard comprises receiving user input events to modify one or more parameters of the structured network and rendering, in response to the user input events, a dynamic visualization of the structured network comprising updated node states and relational connections that are synchronized with a data layer.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 7 is a block diagram of an exemplary method of generating an interactive dashboard;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for generating an interactive dashboard. The apparatus includes at least a computing device comprised of a processor and a memory communicatively connected to the processor. The memory instructs the processor to receive input data comprising a user profile associated with a user. The processor generates, using a machine learning model, a structured network as a function of the input data, wherein the structured network comprises a plurality of nodes, each node associated with an entity of a plurality of entities, wherein generating the structured network comprises classifying each node into one or more categories as a function of feature vectors extracted from the input data and entity parameters representing interconnections among the plurality of entities, assigning each node to one or more tasks as a function of the classification, and updating the assignment as a function of supplemental data. The processor generates an interactive dashboard comprising the structured network, wherein generating the interactive dashboard comprises receiving user input events to modify one or more parameters of the structured network and rendering, in response to the user input events, a dynamic visualization of the structured network comprising updated node states and relational connections that are synchronized with a data layer.

Exemplary embodiments illustrating aspects of the present disclosure are described below in the context of several specific examples.

Figure 1:
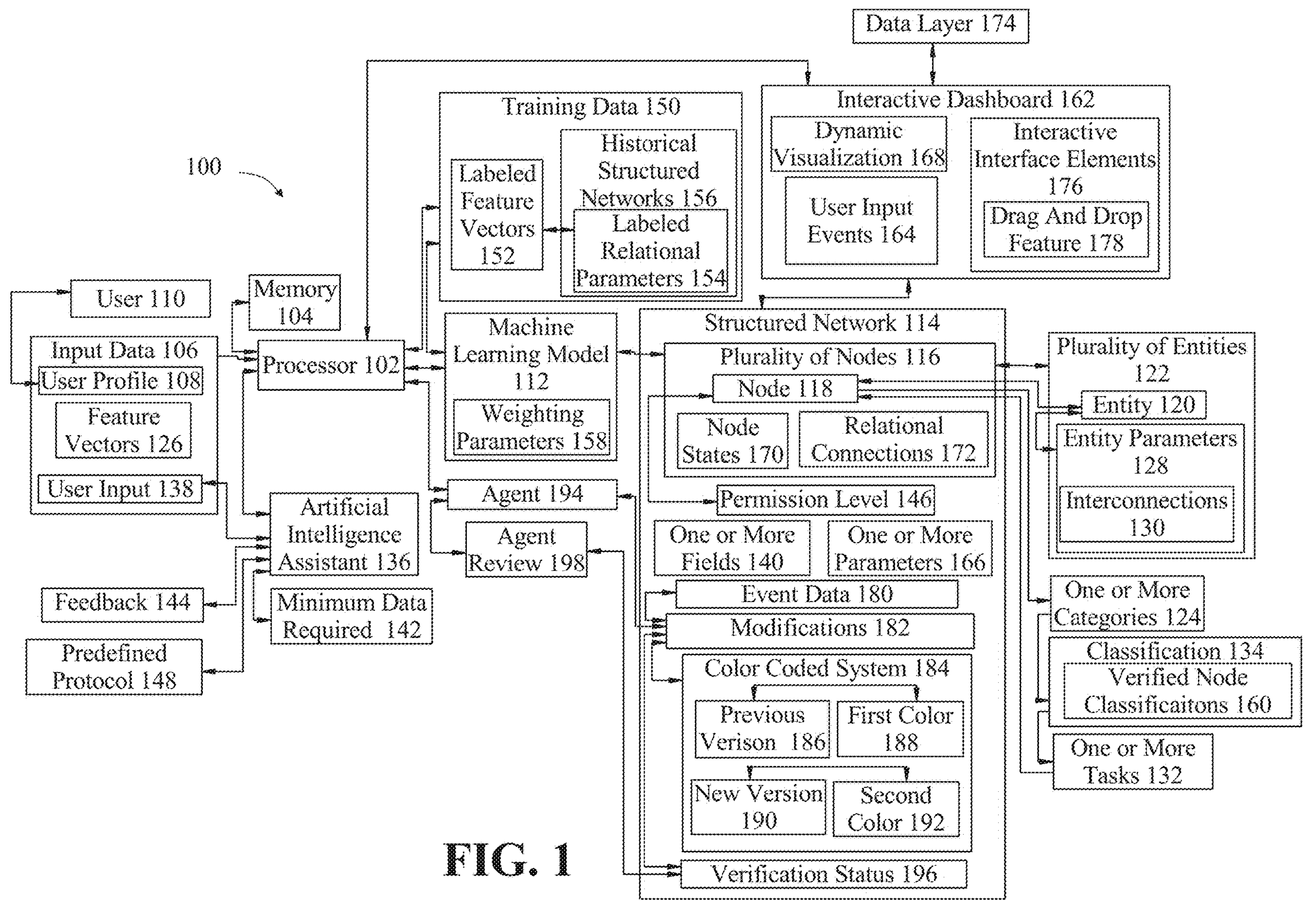
FIG. 1 is a block diagram of an apparatus for generating an interactive dashboard.

Referring now to FIG. 1, an exemplary embodiment of apparatus 100 for generating an interactive dashboard is illustrated. Apparatus 100 can also be referred to as a system for generating an interactive dashboard. Apparatus 100 may include a processor 102 communicatively connected to a memory 104. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 102 may access the information from primary memory.

Still referring to FIG. 1, apparatus 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus computing device. In one or more embodiments, computing device may transmit processes to server wherein computing device may conserve power or energy.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing devices operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

In a non-limiting example, the apparatus 100 may provide an interactive "Workstation" canvas that can be configured to manage family systems in a dynamic and real-time environment. Advisors who manage entire households such as spouses, caregivers, or adult children may use the apparatus 100 to quickly visualize relationships and act efficiently during live conversations. Traditional client relationship management systems may not be well suited for capturing the interconnected nature of family ecosystems and may operate too slowly to support meaningful interaction during client meetings.

The apparatus 100 may include a canvas interface that can present a clear and clickable family view in which individuals may be represented as nodes connected by lines that indicate relationships. A continuously updating data layer may keep information such as roles, tasks, and user presence current as work progresses. Visual features may illustrate products, milestones, or process steps, allowing a professional to easily interpret the roles and activities of family members at a glance. An artificial intelligence assistant may process structured family data in the background and may propose new or revised records that can be reviewed and approved before being added to the canvas. When no household members are recorded, the system may allow a user to create a new family member and assign roles so that the artificial intelligence assistant can generate the minimum data needed to initialize the canvas. A verification process may allow the professional to confirm or adjust information suggested by the artificial intelligence assistant before it becomes part of the permanent record. This process can promote safe and accountable artificial intelligence supported discovery. The canvas may be implemented as a real-time family graph where each node may display current data for tasks, roles, and user activity. Selecting a node may open a structured panel that can read and write fields used by chat functions or triggers. Small on-screen indicators may show which individuals are online and may summarize active tasks. The artificial intelligence system may operate on a defined schema that includes templates for persons, roles, relationships, and tasks. The system may return proposed updates in a structured format such as JavaScript Object Notation that can remain pending until accepted by a human. The interface may visually indicate what information was generated by artificial intelligence and what information was confirmed by a human reviewer. If the household has no existing members, the user may create a starter member and assign roles so that the artificial intelligence assistant can generate the corresponding data for the canvas without interacting directly with the displayed elements. Without limitation, the apparatus 100 may include features for drag and drop reassignment, node-level permission management, and provenance logs that may record who made a suggestion, who verified the data, and what changes occurred, thereby supporting safe and traceable artificial intelligence driven discovery.

Still referring to FIG. 1, processor 102 is configured to receive input data 106 comprising a user profile 108 associated with a user 110. As used in this disclosure, "input data" is data that includes one or more data elements received by the apparatus 100. In an embodiment, the input data 106 may be received for processing, analysis, or generation of a structured network 114. The input data 106 may include user-supplied information, system-generated attributes, contextual information, and data retrieved from one or more external databases. In a non-limiting example, the input data 106 may include demographic details, relationship information, task assignments, or interaction history associated with entities 122 forming part of the network. In a non-limiting example, the input data 106 may include information such as a client's name, age, relationship to other individuals, account identifiers, task lists, meeting notes, or records imported from a customer relationship management platform. The input data 106 may also include communication logs, time-stamped updates, or status indicators that describe the progress of ongoing activities within a household or organization. As used in this disclosure, "user profile" is a structured dataset associated with a specific user 110 that defines personal, behavioral, or contextual characteristics. The user profile 108 may include both static attributes and dynamic parameters that evolve as new data is collected or updated. In a non-limiting example, the user profile 108 may include identifiers, permissions, preferences, communication history, assigned roles, and relationships to other entities 122 within a system. In a non-limiting example, the user profile 108 may include information such as a user's role within a household or business, assigned permissions for accessing certain records, communication preferences, or historical interactions with clients or team members. The user profile 108 may also include attributes such as professional credentials, task completion rates, preferred visualization settings, or affiliations with other users represented within the structured network 114. As used in this disclosure, "user" is an individual or authorized agent that interacts with the apparatus 100. Without limitation, the user 110 may provide input data 106, access output data, and/or control one or more system functions. The user 110 may operate as a primary participant or as a member within a network of associated users. In a non-limiting example, the user 110 may include an advisor, analyst, client, or system administrator who engages with the apparatus 100 through an interactive interface. In a non-limiting example, processor 102 is configured to receive input data 106 comprising a user profile 108 associated with a user 110. The processor 102 may receive this data through one or more communication channels such as a graphical interface, a data import routine, or an application programming interface. Upon receiving the input data 106, the processor 102 may process, classify, and store relevant user profile 108 attributes in memory for subsequent use in generating a structured network 114. This configuration may enable the apparatus 100 to interpret the user's context and relationships in a structured format that facilitates intelligent interaction and real-time visualization through an interactive dashboard 162. In a non-limiting example, the processor 102 may process the input data 106 by performing parsing, normalization, and validation routines. Parsing may include separating structured elements such as names, roles, timestamps, and relationship identifiers from unstructured inputs such as free text or uploaded files. Normalization may include converting data into a standardized schema, such as mapping various role titles ("advisor," "financial planner," or "relationship manager") to a common classification 134. Validation may include verifying data completeness and accuracy using predefined constraints or rules. Technologies such as Natural Language Processing (NLP) models, data cleaning pipelines built with frameworks like Apache Spark, or Python-based ETL (Extract, Transform, Load) routines may be employed to handle these operations efficiently. Once processed, the processor 102 may classify user profile 108 attributes into one or more categories 124 that define how each entity 120 interacts within the structured network 114. In a non-limiting example, classification 134 may include assigning nodes 116 to categories 124 such as "household member," "advisor," "dependent," or "caregiver" as a function of extracted feature vectors 126 or learned relationships. Machine learning algorithms such as support vector machines, decision trees, or neural network classifiers may be applied to identify these roles based on patterns observed in the input data 106. Frameworks such as TensorFlow, PyTorch, or scikit-learn may be used to execute these models, and embeddings or similarity metrics may be generated to represent connections among related entities 122. Following classification 134, the processor 102 may store the resulting user profile 108 attributes and their relationships in memory for subsequent retrieval and visualization. In a non-limiting example, the apparatus 100 may employ an in-memory data store such as Redis or Memcached for high-speed access during active sessions, and a graph database such as Neo4j or Amazon Neptune for persistent storage of the structured network 114. These technologies may enable efficient querying of relationships, real-time synchronization across connected devices, and scalable updates as new data becomes available. Once the data is stored, the processor 102 may access the classified attributes to generate a structured network 114 that represents users and their relationships as nodes 116 and edges. The structured network 114 may be rendered using technologies such as D3.js, GraphQL APIs, or Web Socket connections to maintain real-time synchronization between the data layer 174 and the visual interface. In a non-limiting example, as the processor 102 identifies changes in user profiles or relationships, it may propagate updates through a reactive framework such as Convex, Firebase Realtime Database, or Apollo GraphQL, ensuring that the interactive dashboard 162 dynamically reflects the current state of the network. In this configuration, the processor 102 may continuously refine, reclassify, and update the stored data as new input data 106 or feedback 144 is received, allowing the apparatus 100 to maintain an accurate and adaptive model of the user's relational environment.

Still referring to FIG. 1, processor 102 is configured to generate, using a machine learning model 112, a structured network 114 as a function of the input data 106, wherein the structured network 114 comprises a plurality of nodes 116, each node 118 associated with an entity 120 of a plurality of entities 122, wherein generating the structured network 114 comprises classifying each node 118 into one or more categories 124 as a function of feature vectors 126 extracted from the input data 106 and entity parameters 128 representing interconnections 130 among the plurality of entities 122, assigning each node 118 to one or more tasks 132 as a function of the classification 134 and updating the assignment as a function of supplemental data. The "machine learning model" as defined in FIG. 3 may include one or more algorithms configured to identify patterns, relationships, and predictive associations within the input data 106. The machine learning model 112 may include training and inference components that analyze user profile 108 attributes, extract relevant features, and determine classifications that define how entities 122 relate within a structured network 114. In a non-limiting example, the machine learning model 112 may include a neural network, a random forest, or a gradient boosting model that processes labeled and unlabeled data to infer associations between users, roles, and relationships. The machine learning model 112 may operate on feature vectors 126 derived from text, numerical data, or relational attributes, and may continuously adjust its weighting parameters 158 as verified classifications become available. As used in this disclosure, "structured network" is a data representation that includes a plurality of nodes 116 and their associated interconnections 130, organized according to learned or predefined relationships. The structured network 114 may define how multiple entities 122 interact or relate to one another within a particular context. In a non-limiting example, the structured network 114 may represent a family system, an organization chart, or a client relationship map, where each node 118 corresponds to a specific individual or resource, and the interconnections 130 represent relationships, dependencies, or communication pathways among them. As used in this disclosure, "node" is a discrete data unit within the structured network 114 that represents a single entity 120 or identifiable object associated with one or more attributes. Each node 118 may include metadata, classification 134 labels, and task assignments that describe its current state and role within the network. In a non-limiting example, a node 118 may represent a household member, advisor, team participant, or data object such as a project file or account record. As used in this disclosure, "entity" is an identifiable object, person, or concept represented by a node 118 within the structured network 114. Each entity 120 may include properties or behaviors that define its interactions and relationships with other entities 122. In a non-limiting example, entities 122 may include clients, employees, assets, service accounts, or virtual agents participating in a workflow or relationship graph. In a non-limiting example, the structured network 114 may include a structured family context that visually and logically represents the relationships, roles, and interactions among multiple family members or associated participants. The structured family context may include nodes 116 representing individuals such as parents, children, caregivers, or advisors, and interconnections 130 that define their relationships, such as "parent of," "dependent of," or "advisor to." Each node 118 may include attributes such as name, role, contact information, and assigned responsibilities, while the interconnections 130 may convey relationship strength, communication frequency, or shared financial or caregiving tasks 132. In a non-limiting example, the structured family context may be generated by the apparatus 100 using a combination of user input 138 and machine learning inference to organize household data into a coherent, interactive model. The context may include layers of information, such as financial dependencies, task responsibilities, and communication pathways, that are dynamically updated as new input data 106 or supplemental data is received. For instance, a parent node 118 may be linked to multiple dependent nodes 116 representing children, with one caregiver node 118 linked to both the parent and dependents to indicate shared care responsibilities. In a non-limiting example, the structured family context may further include professional participants such as advisors, accountants, or legal representatives, each represented as nodes 116 connected to the relevant family members they serve. These connections may include metadata describing the type of service provided, such as "financial advisor for household," or "attorney for estate planning," enabling the system to provide a holistic, real-time representation of the family's operational ecosystem. In a non-limiting example, the structured family context may be rendered as an interactive dashboard 162 where each node 118 is selectable to reveal detailed data panels containing individual records, assigned tasks 132, and communication logs. Relationships may be updated through drag-and-drop adjustments, automated classification routines, or manual user input 138, allowing the apparatus 100 to maintain a dynamic, accurate depiction of the family's organizational and relational structure. This configuration may enable professionals to rapidly interpret household data, identify gaps or overlapping roles, and coordinate actions across multiple related participants in real time.

With continued reference to FIG. 1, as used in this disclosure, "categories" are predefined or dynamically generated groupings used by the machine learning model 112 to organize nodes 116 based on shared characteristics, functions, or roles. Each category may represent a class that defines how a node 118 behaves or relates to others within the structured network 114. In a non-limiting example, categories 124 may include classifications such as "client," "advisor," "dependent," "administrator," or "external contact," each of which may carry specific task permissions and data relationships. As used in this disclosure, "feature vectors" are numerical or symbolic representations of data attributes extracted from the input data 106 that describe measurable or categorical characteristics of entities 122. Feature vectors 126 may be used as inputs to the machine learning model 112 to facilitate pattern recognition, similarity analysis, or classification 134. In a non-limiting example, feature vectors 126 may include demographic data, relationship metrics, behavioral patterns, or text embeddings derived from communication history or prior interactions. As used in this disclosure, "entity parameters" are data structures that describe the properties, weights, or relational attributes that define the interconnections 130 among entities 122 within the structured network 114. Entity parameters 128 may include identifiers, relationship strength values, or contextual metadata that indicate how closely two or more entities 122 are related. In a non-limiting example, entity parameters 128 may include indicators such as "spouse of," "reports to," "collaborates with," or "depends on," which may be used by the machine learning model 112 to establish and maintain meaningful links between nodes 116. As used in this disclosure, "interconnections" are the defined relationships or linkages among nodes 116 within the structured network 114 that represent how entities 122 are associated or interact with one another. Each interconnection may carry attributes such as directionality, type, or strength. In a non-limiting example, interconnections 130 may include familial relationships, supervisory hierarchies, communication paths, or task dependencies that visually and logically connect multiple entities 122 within the network. In a non-limiting example, familial relationships may include connections such as "parent of," "child of," "spouse of," or "caregiver for," which define household structures within the structured family context. These interconnections 130 may enable the apparatus 100 to visualize complex multi-generational family systems where dependencies and responsibilities are distributed among several individuals. In a non-limiting example, supervisory hierarchies may include relationships such as "reports to," "manages," or "advises," which define professional or administrative structures that extend beyond the family environment. For instance, a financial advisor node 118 may connect to multiple client family nodes 116, each reflecting different advisory relationships with corresponding access permissions and task responsibilities. In a non-limiting example, communication paths may represent the flow of information among entities 122 and may include metadata such as frequency of contact, preferred communication channel, or last interaction timestamp. The apparatus 100 may use these interconnections 130 to display real-time or historical communication trends, allowing users to identify who communicates with whom and how often. In a non-limiting example, task dependencies may include relationships such as "requires approval from," "notifies," or "blocked by," which define workflow-oriented interactions among nodes 116. These interconnections 130 may allow the apparatus 100 to visualize how the completion of one entity's task affects others within the structured network 114. For example, a dependent's educational plan update may require verification from a parent node 118 and acknowledgment from an advisor node 118 before finalization. Through these various types of interconnections 130, the structured network 114 may provide a unified, relational view of both personal and professional ecosystems, allowing the apparatus 100 to present dynamic, context-aware insights that reflect real-world relationships and operational dependencies.

With continued reference to FIG. 1, as used in this disclosure, "tasks" are actionable items, objectives, or responsibilities assigned to nodes 116 within the structured network 114 as a function of their classification 134 or role. Each task may be dynamically updated or reassigned based on new data or user input 138. In a non-limiting example, tasks 132 may include activities such as "verify contact information," "review financial plan," "approve request," or "schedule meeting," each associated with specific nodes 116 representing individuals or roles. As used in this disclosure, "classification" is the process by which the machine learning model 112 categorizes nodes 116 based on patterns or features derived from the input data 106. Classification 134 may determine the type, role, or operational context of each node 118 within the structured network 114. In a non-limiting example, classification 134 may include assigning a node 118 as a "client," "advisor," or "dependent" based on attributes such as communication frequency, relational hierarchy, or shared metadata. As used in this disclosure, "supplemental data" is additional or updated information that enhances, refines, or corrects the initial input data 106 used to generate the structured network 114. Supplemental data may be derived from external sources, user input 138, or system feedback 144 and may influence task reassignment, reclassification, or relationship updates. In a non-limiting example, supplemental data may include new relationship information received from a client form, a change in employment status, or updated account activity, which may trigger the apparatus 100 to update corresponding nodes 116, classifications, and tasks 132 within the structured network 114.

With continued reference to FIG. 1, in a non-limiting example, the processor 102 may receive input data 106 such as family records, contact lists, and meeting transcripts. From this data, the machine learning model 112 may extract feature vectors 126 representing individual attributes, such as age, relationship type, financial responsibility, or communication frequency. The processor 102 may then evaluate entity parameters 128 describing how each person or participant is connected to others, such as "spouse of," "child of," or "advisor to." Based on these extracted features and relational parameters, the processor 102 may generate the structured network 114, which visually organizes the entities 122 as nodes 116 connected by interconnections 130 that represent familial or professional relationships. In a non-limiting example, the processor 102 may then perform classification 134 to categorize each node 118 into one or more categories 124 based on patterns recognized in the input data 106. For instance, a node 118 representing a person identified as a "primary income earner" and "parent of two dependents" may be classified as a "household head," while another node 118 with attributes indicating "dependent of" and "under age 18" may be classified as a "child." Similarly, a node 118 representing an external professional may be classified as an "advisor" or "caregiver" depending on their role within the data. In a non-limiting example, once nodes 116 are classified, the processor 102 may assign each node 118 to one or more tasks 132 based on its category and role. For example, the "household head" node 118 may be assigned the tasks 132 "review financial plan," "approve caregiver hours," or "update insurance documents." A "dependent" node 118 may be assigned "verify student enrollment," while an "advisor" node 118 may be assigned "prepare quarterly report" or "schedule planning meeting." These tasks 132 may be stored in memory and linked to the corresponding nodes 116, allowing the structured network 114 to function as an active task management system in addition to a relational visualization. In a non-limiting example, the processor 102 may continuously update these task assignments as a function of supplemental data. Supplemental data may include new information received from user input 138, system logs, or external integrations. For instance, if a new dependent is added to the family record, the processor 102 may automatically create a new node 118, classify it as a "child," and assign related tasks 132 such as "add to insurance policy" or "enroll in educational plan." Likewise, if an advisor completes a previously assigned task, the processor 102 may update the structured network 114 to reflect the new task status, remove dependencies, and adjust related tasks 132 for other connected nodes 116. In a non-limiting example, this dynamic configuration may allow the structured network 114 to evolve in real time, reflecting not only the relational structure of the family or organization but also the active responsibilities and workflows associated with each entity 120. This may enable the apparatus 100 to provide an interactive, intelligent dashboard that accurately represents both static relationships and dynamic operational states.

With continued reference to FIG. 1, in a non-limiting example, the process of creating a new node 118 within the structured network 114 may involve a coordinated sequence of graphical user interface operations, event handling routines, and backend data processing actions executed by the processor 102. The graphical interface of the apparatus 100 may be implemented using technologies such as React, Vue.js, or Angular, and the structured network 114 may be visually represented using a graph-rendering library such as D3.js, Cytoscape.js, or Vis.js. The interface may allow a user to add a new node 118 by performing an interactive action such as clicking an "Add Member" button, selecting an existing node 118, or dragging a connection line from one node 118 to a new position on the canvas. When the user 110 performs one of these actions, the system may trigger an event signal such as "Create Node" that includes relevant context data such as the originating node 118, the intended relationship type, and the coordinates of the new position. The event signal may be detected by an application controller implemented using frameworks such as Redux, MobX, or RxJS, which may coordinate the logical handling of the node 118 creation process. As used in this disclosure, "application controller" is a software component that manages the logical flow of operations, event handling, and data coordination between the graphical user interface, the artificial intelligence assistant 136, and the backend systems of the apparatus 100. The application controller may interpret user actions detected through the interface, processes those actions into structured commands or events, and communicates with the processor 102 to execute the appropriate operations within the structured network 114. The application controller may also manage permissions, enforce schema rules, and maintain synchronization between user interactions and real-time data updates. In a non-limiting example, the application controller may receive an event signal such as "Create Node" or "Update Relationship" from the user interface when a user 110 performs an interactive action on the structured family context. The controller may interpret the event, validate the associated data, and transmit the relevant information to the backend through an application programming interface or data socket. The controller may coordinate responses by updating the graphical interface, prompting for missing information, or displaying confirmation messages once the processor 102 has completed the requested operation. Without limitation, the controller may validate whether the action is permitted based on the user's role and the defined schema of the structured network 114. Once validated, the processor 102 may engage the artificial intelligence assistant 136 to determine the minimum data required 142 to generate a valid node 118. The artificial intelligence assistant 136 may analyze the event context and present a form or dialog that prompts the user 110 for key information such as a name, relationship type, or role. For example, if the user 110 drags a connection line from a parent node 118 and drops it on an empty space, the assistant may prompt, "Enter the name and relationship of the new household member." Continuing, after the user 110 provides the requested information, the interface may send the data to the backend through an application programming interface, such as a GraphQL or REST endpoint. The processor 102 may then generate a new node 118 object in memory and define it using a structured format such as JavaScript Object Notation. This node 118 object may include attributes such as a unique identifier, entity type, role, associated relationships, and creation metadata. The apparatus 100 may store the node 118 in an in-memory cache such as Redis for quick retrieval and in a graph database such as Neo4j or Amazon Neptune to preserve the relational structure of the network. Once the node 118 is successfully created, the backend may emit a WebSocket or GraphQL subscription event to notify connected clients that a new node 118 has been added. The graphical interface may automatically update in real time to display the new node 118 and animate its appearance using physics-based layout algorithms that prevent overlap and maintain readability. The artificial intelligence assistant 136 may then analyze the new node 118's attributes and generate suggested actions or tasks 132, such as "Add to household record" or "Schedule introductory meeting," which may appear in an adjacent task panel. The apparatus 100 may record the node 118 creation process in a provenance log that may include information such as the user 110 who created the node 118, the time of creation, and whether the data was entered manually or generated by the artificial intelligence assistant 136. If the user 110 later modifies one or more fields 140 that were initially suggested by the artificial intelligence assistant 136, the system may interpret those changes as feedback 144 to improve future data recommendations. Through this configuration, the apparatus 100 may provide a seamless, intelligent workflow that enables real-time creation, validation, and visualization of new nodes 116 within the structured family context while maintaining accuracy, auditability, and adaptability across all connected devices.

With continued reference to FIG. 1, the at least a processor 102 may be further configured to receive, using an artificial intelligence assistant 136, the input data 106, wherein the input data 106 comprises user input 138 and populate one or more fields 140 of the structured network 114 with the user input 138. As used in this disclosure, "artificial intelligence assistant" is a software-based system configured to interpret, process, and act upon natural language, structured data, or contextual signals to support the operation of the apparatus 100. The artificial intelligence assistant 136 may include one or more machine learning or natural language processing components that enable automated reasoning, intent recognition, and data generation. The artificial intelligence assistant 136 may analyze incoming user input 138, extract relevant entities 122, and populate corresponding data structures within the structured network 114. In a non-limiting example, the artificial intelligence assistant 136 may include a conversational agent, a virtual data intake module, or a predictive completion engine integrated with a large language model that interprets a user's instructions to generate structured data. As used in this disclosure, "user input" is information provided by a user 110 that directs or influences the operation of the apparatus 100. The user input 138 may include text, speech, gesture, selection data, and the like, received through an interactive interface. The user input 138 may be processed by the artificial intelligence assistant 136 to determine intent, extract data values, and perform automated population or modification of fields 140 within the structured network 114. In a non-limiting example, user input 138 may include typed instructions such as "add a new household member named John Smith," spoken commands such as "link John as Mary's spouse," or manual actions such as dragging and dropping a node 118 to create a new relationship within the interactive dashboard 162. As used in this disclosure, "field" is a discrete data element or variable within the structured network 114 that stores a specific attribute, parameter, or value associated with a node 118, entity 120, or interconnection. Each field may be used to capture structured information that defines the characteristics or relationships of entities 122 within the network. In a non-limiting example, fields 140 may include "Name," "Age," "Relationship Type," "Role," "Assigned Task," "Communication Preference," or "Verification Status." Each field may be populated manually through user input 138 or automatically by the artificial intelligence assistant 136 based on contextual analysis or pattern recognition. In a non-limiting example, the processor 102 may be configured to receive, using the artificial intelligence assistant 136, input data 106 comprising user input 138 and populate one or more fields 140 of the structured network 114 with that data. For instance, a financial advisor using the apparatus 100 may state, "Add Sarah Johnson as a dependent of Michael Johnson," through a voice or text interface. The artificial intelligence assistant 136 may parse this input, identify the entities 122 "Sarah Johnson" and "Michael Johnson," determine the relationship type "dependent of," and automatically create or update corresponding nodes 116 and relational interconnections 130 in the structured family context. The assistant may populate fields 140 such as "Name: Sarah Johnson," "Relationship Type: Dependent," "Parent Node: Michael Johnson," and "Category: Child." In another non-limiting example, a user 110 may input, "Assign caregiver role to Emily Davis and add weekly check-in task," and the artificial intelligence assistant 136 may interpret the instruction to create or modify a node 118 representing Emily Davis, populate the "Role" field with "Caregiver," and add a related task field labeled "Weekly Check-In." The assistant may also generate supplemental fields 140 such as "Task Frequency," "Assigned Date," or "Verification Status" to maintain structured consistency. In another non-limiting example, the artificial intelligence assistant 136 may integrate with external data sources such as contact management systems, calendars, or communication logs to automatically populate fields 140 based on recent interactions. For example, when an email or meeting record identifies a new participant, the assistant may extract relevant details such as "Name," "Organization," "Email Address," and "Role," and populate those fields 140 in the structured network 114 without requiring manual entry. In a non-limiting example, the artificial intelligence assistant 136 may integrate with one or more external data sources through application programming interfaces (APIs), webhooks, or data synchronization services that allow it to retrieve, interpret, and structure information relevant to the entities 122 represented in the structured network 114. These integrations may enable the assistant to automatically populate fields 140 based on contextual data gathered from communication records, calendar events, or contact databases without requiring explicit manual input from the user 110. In a non-limiting example, the artificial intelligence assistant 136 may use a calendar integration through platforms such as Google Calendar, Microsoft Outlook Calendar, or Apple Calendar. When a meeting is created or updated, the assistant may retrieve data such as participant names, meeting subjects, timestamps, and locations. The assistant may then extract structured attributes from this data using natural language processing (NLP) and named entity recognition (NER) models, mapping each identified participant to corresponding nodes 116 in the structured network 114. For instance, if a calendar entry titled "Estate Planning Review with John and Sarah Smith" is detected, the assistant may locate or create nodes 116 for "John Smith" and "Sarah Smith," classify them as "clients," and populate fields 140 such as "Meeting Type: Estate Planning Review," "Last Interaction Date," and "Next Scheduled Event." In a non-limiting example, the artificial intelligence assistant 136 may connect to contact management systems such as Salesforce, HubSpot, or Microsoft Dynamics 365 through secure OAuth authentication and RESTful APIs. Upon detecting new or updated contact records, the assistant may extract relevant data fields 140 such as names, phone numbers, company affiliations, and relationship roles. The assistant may then use data-mapping schemas and entity resolution algorithms to match or merge the incoming data with existing nodes 116 in the structured network 114, preventing duplication while maintaining accuracy. For example, if a new contact is added in Salesforce as "Emily Davis-Caregiver," the assistant may identify the corresponding node 118 in the structured family context, update the "Role" field to "Caregiver," and automatically assign a new task such as "Confirm next care session." In a non-limiting example, the artificial intelligence assistant 136 may further integrate with communication logs sourced from email systems, chat applications, or voice transcription platforms such as Gmail, Microsoft Teams, Slack, or Zoom. The assistant may apply semantic analysis, keyword extraction, and relationship modeling techniques to identify significant interactions. For instance, if the assistant detects an email thread between a user 110 and a financial advisor discussing a "college savings plan," it may populate or update fields 140 such as "Topic: College Savings Plan," "Last Contact: [Date]," and "Advisor Node: [Name]," while generating or suggesting a new task labeled "Follow-up discussion with client." To perform these operations efficiently, the artificial intelligence assistant 136 may utilize a data orchestration layer such as Apache Airflow or Prefect to manage synchronization jobs, a message queue system such as Kafka or RabbitMQ to handle real-time data streams, and a knowledge graph database such as Neo4j or Amazon Neptune to represent relational connections 172 among entities 122. The assistant may further employ vector databases such as Pinecone or FAISS to store and retrieve semantic embeddings for entity 120 matching and contextual relevance scoring. As used in this disclosure, "data orchestration layer" is a system architecture component that coordinates, schedules, and manages the movement, transformation, and synchronization of data across multiple sources, services, and processes within the apparatus 100. The data orchestration layer ensures that data flows efficiently between the artificial intelligence assistant 136, external integrations, and the internal components of the structured network 114, maintaining consistency, accuracy, and timeliness of updates. In a non-limiting example, the data orchestration layer may manage automated workflows that extract raw input data 106 from contact management systems, calendars, and communication logs, transform that data into structured formats such as JSON or relational tables, and load it into the apparatus 100 for processing by the machine learning model 112 or artificial intelligence assistant 136. The data orchestration layer may include mechanisms for job scheduling, dependency tracking, error handling, and event-driven execution, enabling the apparatus 100 to process large volumes of real-time data without manual intervention. In a non-limiting example, when the assistant detects a new interaction, it may execute a background process that extracts metadata, analyzes context using NLP pipelines (for example, spaCy, OpenAI Embeddings, or Hugging Face Transformers), and generates structured JSON records representing the new or updated information. The processor 102 may then write these records into the structured network 114, updating relevant fields 140 such as "Recent Interaction," "Updated Role," or "Pending Task."

With continued reference to FIG. 1, the at least a processor 102 may be further configured to recommend, using the artificial intelligence assistant 136, minimum data required 142 for the structured network 114 and verify the minimum data recommended by the artificial intelligence assistant 136 as a function of feedback 144. As used in this disclosure, "minimum data required" is the essential subset of information that enables the apparatus 100 to initialize, generate, or update the structured network 114 in a functional and meaningful manner. The minimum data required 142 may include the fundamental attributes and relationships necessary for the artificial intelligence assistant 136 and the processor 102 to establish identifiable nodes 116, interconnections 130, and classifications among entities 122. In a non-limiting example, the minimum data required 142 may include a user's name, relationship type, role, and a unique identifier such as an email address, account number, or record ID. These elements may allow the apparatus 100 to create an initial node 118, define a relational link within the structured network 114, and support the inference of additional attributes through supplemental data or machine learning processes. In a non-limiting example, the artificial intelligence assistant 136 may determine the minimum data required 142 by analyzing the schema of the structured network 114 and identifying which fields 140 must be present to establish a complete, verifiable record. For instance, when a new family member is added to the structured family context, the assistant may prompt for basic details such as "Name," "Relationship Type," and "Role." Once these data points are provided, the assistant may automatically infer or retrieve secondary data such as "Contact Information," "Task Assignments," or "Communication Preferences" from integrated systems. As used in this disclosure, "feedback" is information received by the apparatus 100 that reflects evaluation, correction, or confirmation of data or system-generated recommendations. Feedback 144 may include human-provided input, system-detected signals, or inferred responses derived from contextual analysis. Feedback 144 may be express, such as a user 110 explicitly confirming or rejecting a recommendation, or implicit, such as behavioral data indicating user satisfaction or correction patterns over time. In a non-limiting example, human feedback 144 may include an advisor confirming that a newly generated family relationship is correct, or editing a suggested node 118 classification 134. The artificial intelligence assistant 136 may record these actions as confirmation or revision events, which may then be used to refine model accuracy. System feedback 144 may include validation results, data integrity checks, or event triggers generated when input data 106 fails schema compliance or when a duplicate record is detected. Inferred feedback 144 may include behavioral indicators such as repeated modifications to a particular type of recommendation, suggesting that the model's logic requires adjustment. In a non-limiting example, the processor 102 may use feedback 144 to verify the minimum data required 142 for the structured network 114. For instance, if the artificial intelligence assistant 136 recommends creating a new "Dependent" node 118 with only a "Name" and "Relationship Type," but system validation rules indicate that a "Date of Birth" is necessary for that classification 134, the processor 102 may request human confirmation or prompt for additional data. Once feedback 144 is received, the processor 102 may update the verification status 196 of the record, adjust internal weighting parameters 158, and refine the artificial intelligence assistant's recommendation logic for future iterations.

With continued reference to FIG. 1, in a non-limiting example, the processor 102 may be configured to work with the artificial intelligence assistant 136 to identify and recommend the minimum data required 142 to initialize or update the structured network 114. When a user 110 attempts to create a new node 118 in the structured family context, such as adding a new family member, caregiver, or advisor, the artificial intelligence assistant 136 may analyze the schema of the structured network 114 and determine which data fields 140 are essential for a valid record. For instance, if a financial advisor begins entering a new client named "David Thompson," the artificial intelligence assistant 136 may recommend collecting a minimum set of information that includes "Name," "Relationship Type," "Role," and "Contact Information." These data points may be sufficient to generate a basic node 118 within the structured family context that can later be enriched with supplemental data. In a non-limiting example, the artificial intelligence assistant 136 may display a guided prompt through the user interface, such as "To create a new household member, please provide a name and define their relationship to the existing family." Once the user 110 enters "David Thompson—Spouse of Mary Thompson," the assistant may populate the "Name" and "Relationship Type" fields 140, classify the node 118 as "Adult Household Member," and link the new node 118 to the existing "Mary Thompson" node 118. If the assistant detects that required attributes such as "Contact Email" or "Date of Birth" are missing, it may recommend the user 110 to enter these additional details to meet the minimum data requirements for validation. In a non-limiting example, the verification of the minimum data may occur as a function of feedback 144 received from multiple sources. The feedback 144 may include express human feedback 144, system feedback 144, and inferred feedback 144. For example, the advisor may explicitly confirm that the artificial intelligence assistant's recommended relationship type ("Spouse") is correct, providing express human feedback 144 that verifies the data. Alternatively, the system may automatically validate that the email format entered for David Thompson is correct, providing system feedback 144 through a schema integrity check. Inferred feedback 144 may occur when the user 110 repeatedly edits the "Role" field after the assistant's recommendation, signaling that the underlying classification model should be adjusted. In a non-limiting example, if the artificial intelligence assistant 136 recommends a new "Dependent" node 118 with only a "Name" and "Relationship Type," but the system rules require an additional "Date of Birth" to calculate eligibility for a particular household program, the processor 102 may detect that the minimum data set is incomplete. The assistant may then prompt the user 110 with a message such as, "Please provide a birth date to complete this dependent record," or automatically infer an approximate range from previously entered context, such as "Child—Elementary School Age." Once the user 110 confirms or corrects this inferred information, the processor 102 may mark the node 118 as verified and store the record in the structured network 114. In a further non-limiting example, the artificial intelligence assistant 136 may log all verification interactions into a provenance record to track how recommendations were made and how feedback 144 influenced data quality. Over time, these feedback 144 interactions may allow the assistant to refine its future minimum data recommendations, ensuring that the structured network 114 maintains both consistency and completeness while minimizing the user's manual data entry burden. This process may allow the apparatus 100 to maintain a balance between automated data population and human verification, ensuring that each node 118 in the structured family context is both accurate and contextually valid.

With continued reference to FIG. 1, the at least a processor 102 may be further configured to assign each node 118 a permission level 146 as a function of a predefined protocol 148. As used in this disclosure, "permission level" is an assigned access designation that defines the extent to which a node 118, user 110, or entity 120 may view, modify, create, or delete data within the structured network 114. The permission level 146 controls interaction privileges for each node 118 and ensures that actions taken within the structured family context comply with established access control policies. Permission levels may be hierarchical, role-based, or dynamically assigned based on user 110 context or classification 134. In a non-limiting example, permission levels may include categories 124 such as "Administrator," "Advisor," "Contributor," "Viewer," and "Restricted." An Administrator node 118 may have full read and write privileges across all nodes 116 and relationships, allowing it to create, edit, or delete records. An Advisor node 118 may have read and conditional write access limited to client-related data, enabling task assignment but restricting deletion of other users' information. A Contributor node 118 may update or comment on specific records but may not alter structural relationships, while a Viewer node 118 may have read-only access for monitoring progress or reviewing assigned tasks 132. A Restricted node 118 may have limited or temporary access, such as a dependent or external collaborator who may only view specific verified fields 140. As used in this disclosure, "predefined protocol" is a structured rule set or schema that governs how permission levels are assigned, inherited, or modified within the apparatus 100. The predefined protocol 148 defines the criteria, hierarchy, and operational logic for managing access rights across the structured network 114. The protocol may include authentication mechanisms, role-based access control (RBAC) policies, or contextual rules derived from system configurations or organizational standards. In a non-limiting example, the predefined protocol 148 may specify that all newly created advisor nodes 116 inherit "Advisor" permissions by default and that dependent nodes 116 automatically receive "Restricted" permissions unless elevated by an administrator. The predefined protocol 148 may include logic for propagating permission changes throughout related nodes 116. For instance, if a parent node's permission level 146 is downgraded, dependent nodes 116 linked through a verified relationship may automatically inherit reduced access capabilities. The predefined protocol 148 may also define exception handling rules, such as requiring dual confirmation from two authorized users before granting elevated access to sensitive financial or health-related data. In a non-limiting example, the predefined protocol 148 may be implemented using an access control framework such as OAuth 2.0, Open Policy Agent (OPA), or Role-Based Access Control (RBAC) modules within an application layer. These frameworks may enforce the predefined protocol 148 by evaluating user 110 credentials, context metadata, and node 118 associations at runtime. The processor 102 may reference the predefined protocol 148 whenever a new node 118 is generated, classifying its permission level 146 based on parameters such as entity type, relationship category, and current user 110 privileges.

With continued reference to FIG. 1, in a non-limiting example, the processor 102 may assign a permission level 146 to each node 118 within the structured family context according to a predefined protocol 148 that governs access control and data modification rights. When a new node 118 is created, such as when a financial advisor adds a new family member to the structured network 114, the artificial intelligence assistant 136 may automatically classify the new entity 120 and trigger a permission assignment process executed by the processor 102. In a non-limiting example, if a user 110 creates a node 118 representing "John Smith" and identifies him as a "Dependent" of "Mary Smith," the processor 102 may reference the predefined protocol 148 to determine which permission level 146 applies to dependent nodes 116. According to the protocol, dependent nodes 116 may receive a "Restricted" permission level 146 that allows view-only access to personal details such as name and relationship type but restricts access to financial records, confidential notes, and administrative settings. The processor 102 may write this permission designation to the node's metadata fields 140 and store it in the graph database to enforce access control throughout the structured network 114. In another non-limiting example, when a node 118 representing a "Financial Advisor" is added, the processor 102 may detect that the entity type corresponds to a role defined in the protocol with elevated privileges. The protocol may specify that advisor nodes 116 receive an "Advisor" permission level 146 that allows read and write access to client financial data and the ability to create or edit associated task nodes 116. However, the same advisor node 118 may be restricted from altering household structure or deleting dependent records. The processor 102 may enforce these rules by linking the permission attributes to role-based access control policies defined within the apparatus 100. In a non-limiting example, if the protocol defines a hierarchy of permissions, the processor 102 may dynamically propagate access adjustments through related nodes 116. For instance, if "Mary Smith," designated as a "Household Head," has her permission level 146 reduced from "Administrator" to "Contributor," the processor 102 may automatically cascade a change that limits associated dependent and advisor nodes 116 from initiating edits to previously accessible records. This propagation may occur through event-driven functions or rule-based triggers defined in the protocol schema. In a further non-limiting example, the predefined protocol 148 may be implemented using a role-based access control framework such as OAuth 2.0 or Open Policy Agent. When a user 110 attempts to access or modify a node 118, the processor 102 may query the protocol to verify that the permission level 146 of the requesting node 118 authorizes the action. For example, if the financial advisor attempts to modify a field within a dependent node 118 that is flagged as "Restricted," the protocol may deny the operation and generate a system log entry for audit tracking. In another non-limiting example, the processor 102 may provide a permission visualization layer within the interactive dashboard 162, allowing users to view the current permission level 146 of each node 118 using icons, color codes, or tooltip overlays. For instance, nodes 116 with "Administrator" permission may appear in gold, "Advisor" nodes 116 in blue, and "Restricted" nodes 116 in gray. When a permission change occurs, the visual interface may update in real time to reflect the modified access state. Through this process, the apparatus 100 may ensure that every node 118 within the structured family context operates under the correct permission constraints defined by the predefined protocol 148, maintaining both security and functional integrity across all relational and data-driven interactions.

With continued reference to FIG. 1, the at least a processor 102 may be further configured to train the machine learning model 112 on training data 150 comprising labeled feature vectors 152 and labeled relational parameters 154 extracted from historical structured networks 156. As used in this disclosure, "training data" is a dataset used by the apparatus 100 to develop, optimize, and refine the machine learning model 112. The training data 150 includes structured information that allows the model to learn patterns, classifications, and predictive relationships among entities 122, nodes 116, and interconnections 130 within the structured network 114. In a non-limiting example, the training data 150 may include previously verified family structures, user profiles, relationship attributes, and task assignments that have been validated by human users or system feedback 144. The training data 150 may also include both input and output examples that demonstrate how nodes 116, categories 124, and relationships should be formed based on real-world family or organizational data. As used in this disclosure, "labeled feature vectors" are numerical or symbolic representations of attributes extracted from the training data 150, each paired with an associated label that identifies its correct category, class, or meaning. The labels may enable the machine learning model 112 to associate input features with known outcomes, thereby improving its ability to perform accurate classification 134 and prediction tasks 132. In a non-limiting example, a labeled feature vector 152 may represent an individual's characteristics such as age, relationship type, and communication frequency, with a label such as "Dependent," "Advisor," or "Household Head." For example, a feature vector [Age: 45, Relationship: Spouse, Role: Financial Decision Maker] may be labeled as "Parent" or "Household Head." These labeled examples may guide the machine learning model 112 in distinguishing between family roles or professional functions within the structured family context. As used in this disclosure, "labeled relational parameters" are data elements that describe the relationships and dependencies among nodes 116 within the training data 150, annotated with labels that indicate the correct or verified type of relationship. Each labeled relational parameter 154 may include attributes such as directionality, strength, or context of the connection between entities 122. In a non-limiting example, a labeled relational parameter 154 may represent a verified relationship such as "Parent of," "Dependent of," or "Advisor to," which allows the machine learning model 112 to learn how to infer or validate interconnections 130 in new or incomplete datasets. For instance, a parameter describing a relationship between two nodes 116 such as "Mary Smith" and "John Smith" with a label "Parent of" may train the model to recognize that similar entity 120 pairings likely indicate a hierarchical or dependent link in future input data 106. As used in this disclosure, "historical structured networks" are previously generated and verified structured networks that serve as reference datasets for training and validation of the machine learning model 112. Each historical structured network may include nodes 116, entities 122, relationships, and task associations that have been confirmed through human review or system verification. These historical networks may provide real-world examples of how familial, advisory, or organizational structures evolve over time and how accurate classifications and relationships have been defined. In a non-limiting example, historical structured networks 156 may include archived family relationship maps, advisor-client interaction graphs, or organizational hierarchies maintained within the apparatus 100. The processor 102 may extract feature vectors 126 and relational parameters from these networks, label them according to verified categories 124 and relationship types, and use them as training data 150 to improve the model's accuracy. In a non-limiting example, the processor 102 may use these labeled datasets to train the machine learning model 112 through supervised learning techniques implemented in frameworks such as TensorFlow, PyTorch, or Scikit-learn. During training, the model may iteratively adjust its weighting parameters 158 to minimize error between predicted classifications and the labeled data from historical structured networks 156. Over time, this process may enable the apparatus 100 to automatically identify roles, infer relationships, and update structured family contexts with high accuracy based on new or incomplete input data 106.

With continued reference to FIG. 1, the at least a processor 102 may be further configured to adjust weighting parameters 158 of the machine learning model 112 as a function of verified node classifications 160. As used in this disclosure, "weighting parameters" are numerical coefficients or adjustable variables within the machine learning model 112 that determine the relative importance or influence of specific input features, relationships, or training examples during the model's learning and prediction processes. The weighting parameters 158 may control how much each feature vector or relational parameter contributes to the model's output classification 134 or decision. The processor 102 may modify these parameters iteratively during model training or operation to improve prediction accuracy and alignment with verified data. In a non-limiting example, weighting parameters 158 may define how strongly the model associates features such as "relationship type," "age," or "communication frequency" with a particular node 118 classification 134. For instance, in a structured family context, the model may initially assign equal weight to the features "shared address" and "age difference" when determining familial relationships. Over time, based on verification feedback 144, the model may learn that "age difference" is less predictive of a "parent-child" classification 134 than "shared address" or "dependence records." The processor 102 may adjust the corresponding weighting parameters 158 so that the model places greater emphasis on the more reliable feature when classifying future nodes 116. These adjustments may be achieved through gradient-based optimization algorithms such as stochastic gradient descent (SGD), Adam, or RMSProp, which update the model's internal weights according to observed errors or feedback 144. As used in this disclosure, "verified node classifications" are confirmed designations assigned to nodes 116 within the structured network 114 that identify the correct role, type, or category of each entity 120. Verified node classifications 160 represent the ground truth data against which the machine learning model 112 evaluates and refines its predictions. Verification may occur through human confirmation, system validation, or automated rule-based checks within the apparatus 100. In a non-limiting example, verified node classifications 160 may include confirmations such as "John Smith is correctly labeled as a Dependent," "Mary Smith is verified as Household Head," or "Robert Lee is confirmed as Financial Advisor." These verified outcomes may result from user 110 review during data entry, approval workflows in the graphical interface, or system feedback 144 loops that validate consistency with predefined relationship rules. For instance, if the artificial intelligence assistant 136 predicts that a new node 118 should be classified as "Dependent," but the user 110 corrects it to "Caregiver," that correction becomes a verified node 118 classification 134, which the processor 102 may use to retrain or fine-tune the model. In a non-limiting example, the processor 102 may adjust the weighting parameters 158 of the machine learning model 112 as a function of these verified node classifications 160. When the model's predictions are confirmed as correct, the weights associated with those contributing features may be strengthened to reinforce their predictive value. Conversely, if a user 110 or system modifies an incorrect prediction, the processor 102 may reduce the corresponding weights and adjust the model's internal parameters to prevent future misclassification. Over time, this feedback-driven adjustment process may increase the accuracy, adaptability, and contextual awareness of the machine learning model 112, enabling the apparatus 100 to classify nodes 116 and relationships within the structured family context with progressively higher precision.

With continued reference to FIG. 1, In a non-limiting example, the processor 102 may adjust the weighting parameters 158 of the machine learning model 112 as a function of verified node classifications 160 through a continuous feedback 144 process that refines the accuracy of node 118 categorization within the structured family context. For example, when the artificial intelligence assistant 136 receives new input data 106 describing "Emily Davis," the model may initially predict that Emily is a "Dependent" based on feature vectors 126 such as "Age: 17," "Relationship Type: Child of Mary Davis," and "Communication Frequency: Daily." These features may include weighting parameters 158 that determine how strongly each attribute influences the model's classification 134 decision. After the node 118 is created, a human user 110 such as a family advisor may review the suggested classification 134 and confirm that Emily is correctly categorized as a "Dependent." This confirmation may serve as a verified node 118 classification 134, which the processor 102 may use to adjust the weighting parameters 158 associated with the relevant features. For instance, the model may increase the weights assigned to "Age under 18" and "Relationship Type equals Child of," reinforcing that these features are reliable indicators of the "Dependent" category in future predictions. In another non-limiting example, if the advisor corrects the classification 134 and identifies Emily as a "Caregiver," the processor 102 may treat this correction as a feedback 144 signal indicating that the model's prior weighting distribution was inaccurate. The processor 102 may then reduce the influence of features such as "Age under 18" and increase the weights associated with features that better represent a caregiving role, such as "Task Type equals Household Assistance" or "Relationship Type equals Employed by." This adjustment may be performed using an optimization algorithm such as stochastic gradient descent or Adam, which updates the internal parameters of the model to minimize classification 134 error. In a further non-limiting example, the machine learning model 112 may aggregate verified node classifications 160 across multiple instances to improve its general accuracy. For instance, if verified records show that nodes 116 with high communication frequency, financial task involvement, and advisory roles consistently correspond to "Advisor" classifications, the processor 102 may increase the weighting parameters 158 for those features across the model. As a result, when new input data 106 is received for "Robert Lee," who communicates regularly with multiple household heads and manages several financial planning tasks 132, the model may predict "Advisor" with greater confidence. Through this iterative process, the apparatus 100 may continuously refine the weighting parameters 158 of the machine learning model 112 based on verified node classifications 160, allowing the system to learn from confirmed data, improve predictive accuracy, and maintain reliable role assignments within the structured family context.

Still referring to FIG. 1, processor 102 is configured to generate an interactive dashboard 162 comprising the structured network 114, wherein generating the interactive dashboard 162 comprises receiving user input events 164 to modify one or more parameters 166 of the structured network 114 and rendering, in response to the user input events 164, a dynamic visualization 168 of the structured network 114 comprising updated node states 170 and relational connections 172 that are synchronized with a data layer 174. As used in this disclosure, a "user input event" is an action or signal generated by a user through an input interface that prompts a system or processor to perform a corresponding operation or update. In a non-limiting example, a user input event may include selecting, dragging, clicking, typing, touching, or otherwise manipulating a graphical control or data element within the interactive dashboard to modify one or more parameters of the structured network. As used in this disclosure, "interactive dashboard" is a graphical user interface that visually presents and manages the structured network 114 in a dynamic and user-responsive environment. The interactive dashboard 162 may enable users to view, create, modify, and analyze entities 122, relationships, and tasks 132 through direct interaction with graphical elements representing nodes 116 and their interconnections 130. The interactive dashboard 162 may support real-time updates, data-driven rendering, and bidirectional communication with the underlying data layer 174 to ensure that changes made by the user 110 or system are immediately reflected in the display. In a non-limiting example, the interactive dashboard 162 may include visual components such as a network canvas, data panels, task summaries, and contextual tooltips that respond to user interactions, allowing users to navigate complex family or organizational structures intuitively. User input 138 may include actions such as clicking, typing, dragging, speaking, or selecting elements within the interactive dashboard 162. The processor 102 may interpret user input 138 as commands to create new nodes 116, update relationships, assign roles, or adjust visualization properties within the structured network 114. In a non-limiting example, user input 138 may include selecting a node 118 to edit its details, dragging a connector to create a new relationship, or typing instructions to the artificial intelligence assistant 136 to update task assignments. As used in this disclosure, "parameter" is a configurable attribute of the structured network 114 that influences the behavior, appearance, or relationships of nodes 116 and connections. Without limitation, parameters may include data values, feature weights, visualization settings, or system-defined properties that can be modified through user interaction or automated processes. In a non-limiting example, parameters may include a node's role, category, task assignment, permission level 146, or visual attributes such as color or size. Adjusting a parameter may cause corresponding updates in the structured network's representation or data synchronization within the data layer 174. As used in this disclosure, "dynamic visualization" is a real-time, data-driven graphical representation of the structured network 114 that updates in response to user actions, system events, or changes in data. The dynamic visualization 168 may allow users to see immediate visual feedback 144 when a node 118, connection, or attribute is modified. In a non-limiting example, the dynamic visualization 168 may use animated transitions to reflect relationship changes, color shifts to represent updated task statuses, or visual cues to indicate newly verified data. The dynamic visualization 168 may be implemented using visualization technologies such as D3.js, WebGL, or Canvas-based rendering frameworks, allowing smooth, interactive manipulation of complex networks. As used in this disclosure, "node state" is the current configuration, data condition, or visual representation of a node 118 within the structured network 114. The node state 170 may include attributes such as classification 134, verification status 196, active tasks 132, online presence, interaction history, and the like. The node state 170 may change as a result of user input 138, automated updates, or feedback 144 from the artificial intelligence assistant 136. In a non-limiting example, when a family member's status changes from "Pending Verification" to "Verified," the node state 170 may update to reflect a new color, label, or icon indicating confirmation. Similarly, a node representing a caregiver may change state when assigned a new task or when marked as inactive. As used in this disclosure, "relational connection" is a logical and visual link that defines the relationship between two or more nodes 116 within the structured network 114. Each relational connection 172 represents an association, dependency, or interaction between entities 122 and may include attributes such as directionality, type, and status. In a non-limiting example, relational connections 172 may represent relationships such as "Parent of," "Dependent of," "Advisor to," or "Reports to." The relational connection 172 may also visually encode properties such as verification status 196, task dependency, or interaction frequency using line styles, thickness, or color gradients. As used in this disclosure, "data layer" is a structured computational layer that manages the storage, synchronization, and retrieval of data associated with the structured network 114. The data layer 174 ensures that all updates made within the interactive dashboard 162 are consistent, persistent, and accessible to connected systems or users. The data layer 174 may include in-memory databases, graph databases, or real-time synchronization frameworks that maintain alignment between the user interface and the underlying data model. In a non-limiting example, the data layer 174 may be implemented using technologies such as Convex, Firebase, or Redis to support real-time updates and event-driven communication. The data layer 174 may broadcast state changes, such as node 118 updates or relationship modifications, to all connected clients, ensuring that the interactive dashboard 162 remains synchronized across users and devices.

With continued reference to FIG. 1, the interactive dashboard 162 may be displayed using a user interface. As used in this disclosure, a "user interface" is a collection of hardware and/or software components configured to enable interaction between a user 110 and a computing device, wherein the user interface facilitates the presentation of data to the user 110 and the reception of input from the user 110. The user interface may include, without limitation, graphical user interfaces, command-line interfaces, application programming interfaces, voice-based interfaces, haptic interfaces, or augmented reality interfaces. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user 110 performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

With continued reference to FIG. 1, in an embodiment, the graphical user interface and an event handler may operate together to enable seamless interaction between the user 110 and the apparatus 100. The GUI serves as the visual and interactive layer through which the user 110 engages with the apparatus 100, presenting elements such as buttons, sliders, input fields 140, and informational displays. The event handler, on the other hand, functions as the underlying mechanism that monitors and responds to user interactions with the GUI. For example, when a user 110 clicks a button on the GUI to request an explanation of a concept, the event handler may detect the click event, identify its context, and trigger the appropriate processes within the apparatus 100 to generate a tailored response. This interplay may ensure dynamic and responsive system behavior, as the event handler processes various input events such as clicks, taps, keystrokes, or voice commands, and relays these inputs to the relevant system components. The GUI subsequently updates to reflect the system's responses, such as displaying output, modifying visual elements, or providing real-time feedback 144. Together, the GUI and event handler create an intuitive and interactive experience, bridging user actions and system functionality to achieve efficient and personalized outcomes.

With continued reference to FIG. 1, an "event handler" as used in this disclosure, is a module, data structure, function, and/or routine that performs an action in response to an event. For instance, and without limitation, an event handler may record data corresponding to user selections of previously populated fields 140 such as drop-down lists and/or text auto-complete and/or default entries, data corresponding to user selections of checkboxes, radio buttons, or the like, potentially along with automatically entered data triggered by such selections, user 110 entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to a user 110 in response to such requirements.

With continued reference to FIG. 1, as used in this disclosure, a "visual element" is a component or feature within a system, display, or interface that conveys information through visual means. In a non-limiting example, the visual element may include text, images, icons, shapes, colors, and/or other graphical components designed to be perceived by the user 110. In a non-limiting example, the visual element may aid in communication, navigation, and/or interaction with the system. Without limitation, the visual element may be used to enhance user 110 experience, guide behavior, and/or represent data visually in an intuitive or informative way. A visual element may include data transmitted to display device, client device, and/or graphical user interface. In some embodiments, visual element may be interacted with. For example, visual element may include an interface, such as a button or menu. In some embodiments, visual element may be interacted with using a user device such as a smartphone, tablet, smartwatch, or computer.

With continued reference to FIG. 1, in an embodiment, the apparatus 100 and or the downstream device may include a data structure. As used in this disclosure, "data structure" is a way of organizing data represented in a specialized format on a computer configured such that the information can be effectively presented in a graphical user interface. In some cases, the data structure includes any input data 106. In some cases, the data structure contains data and/or rules used to visualize the graphical elements within a graphical user interface. In some cases, the data structure may include any data described in this disclosure. In some cases, the data structure may be configured to modify the graphical user interface, wherein data within the data structure may be represented visually by the graphical user interface. In some cases, the data structure may be continuously modified and/or updated by processor 102, wherein elements within graphical user interface may be modified as a result. In some cases, processor 102 may be configured to transmit display device and or the downstream device the data structure. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio, and microwave data and/or signals, combinations thereof, and the like, among others. Processor 102 may transmit the data described above to a database wherein the data may be accessed from the database. Processor 102 may further transmit the data above to a display device, client device, or another computing device. The data structure may serve as the organizational framework that stores, retrieves, and manages data required for processing events and updating the GUI. The data structure may act as a bridge between the user's input, captured by the event handler, and the output displayed on the GUI, ensuring that information is handled efficiently and accurately throughout the interaction. For example, without limitation, when a user 110 interacts with a dropdown menu in the GUI to select a topic, the event handler may capture this input and accesses a data structure. The data structure may retrieve the relevant information such as, text explanations, videos, or interactive exercises, and passes it back to the event handler, which may then trigger the appropriate updates to the GUI. In another embodiment, the data structure may also maintain the state of the system, tracking user progress, preferences, and session history. For instance, without limitation, a hash table may store user specific configurations which the event handler references when processing interactions. The GUI may then dynamically adapt to display content aligned with these configurations. This integration may ensure that user inputs are seamlessly translated into meaningful system outputs, with the data structure enabling rapid access, consistency, and scalability throughout the process. As used in this disclosure, a "hash table" is a data structure that stores data in a way that allows for fast retrieval, insertion, and deletion of elements. The hash table may organize data into key-value pairs, where each key is unique and used to identify its corresponding value. A hash table may use a hash function to compute an index, or hash code, from the key, which determines where the key-value pair is stored within an array or list.

With continued reference to FIG. 1, as used in this disclosure, an "interactive element" is a component or feature within a graphical user interface (GUI) that allows users to perform actions, provide input, or engage with the apparatus 100. Interactive elements may be designed to facilitate two-way communication between the user 110 and the system, enabling the user 110 to influence the behavior of the apparatus or obtain feedback 144 in response to their actions. Examples of interactive elements may include buttons, dropdown menus, sliders, checkboxes, input fields 140, and hyperlinks. More advanced interactive elements may include drag-and-drop interfaces, interactive diagrams, or dynamically updating content areas that respond to user actions in real time. The interactive elements may enhance user engagement by providing intuitive and responsive mechanisms for interacting with the system. Interactive elements may operate by responding to user actions such as clicks, taps, swipes, or keyboard inputs, and triggering predefined system behaviors or processes. The execution of the interactive elements may require a combination of front-end and back-end technologies that work together to provide seamless functionality and user interaction. On the front end, technologies such as HTML and CSS may define the structure, appearance, and layout of the interactive elements, while JavaScript may enable dynamic functionality. For example, without limitation, JavaScript may detect when the user clicks a button and trigger actions or animations. Front-end frameworks like React, Angular, or Vue.js may further enhance development by offering reusable components and efficient rendering mechanisms. On the back end, the system may process the user's input, retrieve the necessary data, and communicate with the front end to provide an appropriate response. APIs may act as a bridge between the front end and back end, facilitating data transfer, such as sending a user's form submission to the server and retrieving processed results. Server-side logic, implemented using languages like Python, Java, or Node.js, may handle input processing and return relevant data. Additional supporting technologies may ensure the smooth operation of interactive elements. Event listeners, for instance, may continuously monitor for specific actions like mouse clicks or text entries, executing code when such events are detected. Efficient data structures, such as hash tables or dictionaries, may store interactive state data, such as user preferences or settings, for quick access and updates. Databases, including MySQL or MongoDB, may manage and store the data required for interactive features, such as user profiles or historical activity. Communication technologies may also help maintain the responsiveness of interactive elements. AJAX (Asynchronous JavaScript and XML) may allow the front end to update portions of a web page without requiring a full page reload, enhancing responsiveness. WebSockets may provide real-time interaction capabilities, such as live chats or collaborative tools, by enabling persistent communication between the client and the server. Without limitation, the apparatus 100 may include one or more APIs. As used in this disclosure, an "application programming interface (API)" is a set of defined protocols, tools, and methods that allow different software applications, systems, or components to communicate and interact with each other. An API may act as an intermediary that enables a client application, such as a user-facing app, to send requests to a server or service and receive the necessary responses, facilitating seamless integration and functionality across diverse systems.

With continued reference to FIG. 1, as used in this disclosure, "downstream device" is a device that accesses and interacts with apparatus 100. For instance, and without limitation, downstream device may include a remote device and/or apparatus 100. In a non-limiting embodiment, downstream device may be consistent with a computing device as described in the entirety of this disclosure. Without limitation, the downstream device may include a display device. As used in this disclosure, a "display device" refers to an electronic device that visually presents information to the entity 120. In some cases, display device may be configured to project or show visual content generated by computers, video devices, or other electronic mechanisms. In some cases, display device may include a liquid crystal display (LCD), a cathode ray tube (CRT), a plasma display, a light emitting diode (LED) display, and any combinations thereof. In a non-limiting example, one or more display devices may vary in size, resolution, technology, and functionality. Display device may be able to show any data elements and/or visual elements as listed above in various formats such as, textural, graphical, video among others, in either monochrome or color. Display device may include, but is not limited to, a smartphone, tablet, laptop, monitor, tablet, and the like. Display device may include a separate device that includes a transparent screen configured to display computer generated images and/or information. In some cases, display device may be configured to present a graphical user-interface (GUI) to a user 110, wherein a user 110 may interact with a GUI. In some cases, a user 110 may view a GUI through display. Additionally, or alternatively, processor 102 be connected to display device. In one or more embodiments, transmitting the interactive dashboard 162 may include displaying the interactive dashboard 162 at display device using a visual interface.

With continued reference to FIG. 1, the at least a processor 102 may be further configured to generate interactive interface elements 176, wherein the interactive interface elements 176 are configured to provide a drag and drop feature 178 for defining the relational connections 172 of each node 118. As used in this disclosure, "interactive interface element" is a graphical component within the interactive dashboard 162 that allows a user 110 to directly manipulate, control, or modify data or relationships within the structured network 114 through user 110 input. Each interactive interface element may be designed to respond to user actions such as clicking, selecting, hovering, or dragging, and to visually update in real time as the user interacts with it. In a non-limiting example, interactive interface elements 176 may include nodes 116, connectors, buttons, sliders, panels, icons, or contextual menus that allow a user 110 to add new entities 122, edit existing records, or create new relationships among nodes 116. These elements may be rendered using user interface frameworks such as React, Vue.js, or Angular, and may communicate with the data layer 174 to maintain synchronization between user actions and system state. As used in this disclosure, "drag and drop feature" is a user interaction capability that enables a user 110 to define or modify the relationships among nodes 116. In an embodiment, the drag and drop feature 178 may enable a user 110 to define or modify the relationships among nodes 116 by selecting an element, dragging it across the user interface, and releasing it in a target location. The drag and drop feature 178 may provide a natural, visual way for users to create relational connections 172 within the structured network 114 by drawing associations directly on the interactive canvas. The processor 102 may interpret drag and drop actions as structured events and translate them into data updates within the underlying data layer 174, thereby updating the network graph and its corresponding visualization. In a non-limiting example, when a user 110 wishes to establish a new relationship between two entities 122 within the structured family context, the user 110 may click and hold a node 118 representing "Mary Smith" and drag a connection line toward another node 118 labeled "John Smith." Upon release, the interactive interface element may display a contextual menu or prompt asking the user 110 to define the relationship type, such as "Parent of," "Spouse of," or "Dependent of." Once the user 110 selects the desired relationship, the processor 102 may create a corresponding relational connection 172 within the structured network 114, update the underlying data layer 174, and trigger a dynamic visualization 168 update that displays the new link between the two nodes 116. In another non-limiting example, the drag and drop feature 178 may be used to reassign task ownership or adjust hierarchical relationships among professional participants. For instance, an advisor may drag a task icon from one node 118 labeled "Financial Advisor" to another node 118 labeled "Client Household Head." The processor 102 may interpret this event as a reassignment operation and update the task's associated parameters in the data layer 174 to reflect the new ownership. The interactive dashboard 162 may then refresh automatically to display the updated task count and visual indicators on both affected nodes 116. In another non-limiting example, the interactive interface elements 176 may include visual affordances such as highlighted borders, snap-to alignment cues, and hover animations that guide the user 110 during the drag and drop interaction. When a valid connection is possible, the target node 118 may visually pulse or highlight to indicate that the action can be completed successfully. The system may also employ validation logic within the processor 102 to ensure that connections adhere to predefined schema rules, preventing invalid relationships such as linking two dependent nodes 116 directly without a parent node 118 intermediary. As used in this disclosure, "visual affordances" are graphical cues, indicators, or design elements within the interactive dashboard 162 that convey the possible actions a user 110 may take with respect to nodes 116, relationships, or other interface components in the structured network 114. Visual affordances are intended to guide user 110 interaction by suggesting functionality through appearance, movement, or contextual feedback 144. These affordances may include changes in color, shape, opacity, highlighting, or animation that signal interactivity or state transitions to the user 110. In a non-limiting example, visual affordances may include a subtle glow or border highlight around a node 118 when the cursor hovers over it, indicating that the node 118 can be selected, moved, or edited. A relationship line between two nodes 116 may change color when it is eligible for reconnection, suggesting that a drag and drop action may establish a new link. Buttons or icons may include shadow effects or animated scaling that communicate their clickability. In another non-limiting example, visual affordances may appear during active operations such as node 118 creation or data verification. When a user 110 drags a node 118 toward a valid connection point, the target node 118 may pulse or briefly enlarge to indicate that the connection is permitted. When a modification to a node's data is pending verification, a small checkmark icon or a color-coded border may appear as a visual affordance to indicate its status. In a further non-limiting example, the apparatus 100 may use dynamic visual affordances to represent system-driven states. For instance, if the artificial intelligence assistant 136 generates a suggested relationship, the suggested nodes 116 and connectors may appear semi-transparent until verified by the user 110. Once confirmed, they may animate into full opacity, signaling finalization. Similarly, when data is being synchronized with the data layer 174, an animated loading ring may appear to afford the understanding that the system is processing a change. Through these design features, visual affordances may enhance usability, reduce cognitive load, and provide clear, intuitive feedback 144 about available interactions and system status within the structured network 114. In a non-limiting example, the drag and drop operations may be implemented using event-handling libraries such as React DnD, Interact.js, or custom HTML5 drag and drop APIs. Each drag and drop event may emit a structured data object containing the source node ID, target node ID, relationship type, and timestamp. The processor 102 may process this object, update the relational connection 172 attributes within the data layer 174, and record the event in the provenance log for future auditing or version tracking. Through these interactive interface elements 176 and the drag and drop feature 178, the apparatus 100 may provide an intuitive, visual mechanism for defining and adjusting relationships among nodes 116, enabling users to build, edit, and visualize complex family or organizational structures in real time with minimal technical input.

With continued reference to FIG. 1, the at least a processor 102 may be further configured to log event data 180 associated with modifications 182 of the structured network 114, display the modifications 182 of the structured network 114 with a color coded system 184, wherein a previous version 186 is associated with a first color 188 and a new version 190 is associated with a second color 192, verify the modifications 182 of the structured network 114 using an agent 194, and display a verification status 196 as a function of an agent review 198 associated with the agent 194. As used in this disclosure, "event data" is the recorded information that describes actions, changes, or interactions that occur within the structured network 114. Each event data 180 record may include details such as the event type, timestamp, initiating user 110 or system process, affected nodes 116 or relationships, and the nature of the modification performed. The apparatus 100 may log event data 180 to maintain a verifiable history of system activity, allowing reconstruction of network evolution or auditing of user actions. In a non-limiting example, event data 180 may include actions such as the creation of a new node 118, the update of a relationship type, the reassignment of a task, or the verification of a data field. The processor 102 may store this event data 180 in a provenance database or an immutable ledger structure for traceability and compliance. As used in this disclosure, "modification" is any change, update, or adjustment applied to a node 118, relationship, or parameter within the structured network 114. Modifications 182 may result from user input 138, automated system operations, or feedback 144 from the artificial intelligence assistant 136. In a non-limiting example, modifications 182 may include renaming a node 118, altering a relationship from "Dependent of" to "Spouse of," reassigning a task, or updating a node's verification status 196. The processor 102 may detect modifications 182 through event handlers and propagate them to the data layer 174, ensuring that the updated information is reflected across all connected client devices. As used in this disclosure, "color coded system" is a visual feedback mechanism that uses color differentiation to represent the state or version of data elements within the structured network 114. The color coded system 184 allows users to distinguish between prior and updated versions of nodes 116, relationships, or tasks 132 at a glance. In a non-limiting example, the color coded system 184 may employ specific color assignments to indicate whether a node 118 has been modified, verified, or remains unaltered, thereby improving data transparency and interpretability. As used in this disclosure, "first color" is a designated visual identifier used to represent the previous version 186 of a node 118, relationship, or data element within the structured network 114. The first color 188 may remain constant across all instances of version comparison to provide consistent interpretation. In a non-limiting example, the first color 188 may be displayed in gray or light blue to indicate prior data states that have since been modified or replaced. As used in this disclosure, "new version" is the updated or current representation of a node 118, relationship, or parameter that replaces or supersedes a previous version 186 within the structured network 114. Each new version 190 may include updated field values, corrected classifications, or refined relationship parameters. The processor 102 may store both the previous and new versions to enable comparison, validation, and rollback operations. As used in this disclosure, "second color" is a designated visual identifier used to represent the new version 190 of a node 118, relationship, or parameter after a modification. The second color 192 may provide immediate visual distinction from the first color 188 to indicate which data reflects the most recent update. In a non-limiting example, the second color 192 may be displayed in green or gold to signify active or validated data, while the first color 188 remains visible as a muted background reference for comparison. As used in this disclosure, "agent" is an automated or human entity responsible for verifying, validating, or reviewing modifications 182 made within the structured network 114. The agent 194 may operate under defined verification protocols to ensure that updates are accurate, authorized, and compliant with system or organizational standards. In a non-limiting example, the agent 194 may include a human reviewer such as a financial advisor or case manager, or an automated verification module powered by the artificial intelligence assistant 136 that cross-references modifications 182 against rule-based or statistical thresholds. As used in this disclosure, "verification status" is an indicator that represents the current validation state of a modification, node 118, or relational connection 172 within the structured network 114. The verification status 196 may reflect whether a change has been reviewed, accepted, rejected, or is still pending validation by the agent 194. In a non-limiting example, verification statuses 196 may include "Unverified," "Pending Review," "Approved," or "Rejected," and may be displayed as icons, colored indicators, or textual labels within the interactive dashboard 162. As used in this disclosure, "agent review" is the evaluation process performed by the agent 194 to confirm the accuracy and validity of a modification within the structured network 114. The agent 194 review may involve examining event data 180, comparing the previous and new versions, and determining whether the change aligns with system rules or user intent. In a non-limiting example, an agent review 198 may occur when an advisor verifies that a newly added relationship between two family members is correct or when an automated module confirms that a classification 134 change matches historical behavioral patterns. The results of the agent review 198 may directly update the verification status 196 of the modified element, triggering a color coded visual update within the dashboard to indicate whether the change has been confirmed or requires further action.

With continued reference to FIG. 1, in a non-limiting example, the processor 102 may be configured to log event data 180 and display modifications 182 to the structured network 114 using a color coded system 184 that visually distinguishes between older and updated data versions while maintaining a verified audit trail. When a user 110 or the artificial intelligence assistant 136 updates a node 118, such as changing the relationship between "Mary Smith" and "John Smith" from "Spouse of" to "Divorced from," the system may automatically generate event data 180 describing this action. The event data 180 may include a timestamp, the identity of the user 110 or process that initiated the change, the affected nodes 116, the previous field value, the new field value, and contextual metadata such as "Reason for Update: User Input via Advisor Dashboard." This event data 180 may be stored within a provenance log managed by the apparatus 100 for transparency and traceability. In a non-limiting example, once the modification occurs, the processor 102 may update the structured network 114 visualization within the interactive dashboard 162. The previous relationship ("Spouse of") may be displayed in a first color 188, such as light gray, to indicate that it represents a prior version, while the new relationship ("Divorced from") may appear in a second color 192, such as green, to indicate the current state. This color coded system 184 may allow users to view changes at a glance and visually distinguish between historical and active data. In some configurations, the user 110 may hover over a relationship line or node 118 to reveal a tooltip showing both versions of the data, along with their respective timestamps and author details, enabling immediate contextual comparison. In a further non-limiting example, the modification may then enter a verification workflow involving an agent 194. The agent 194 may be a human reviewer, such as a family advisor, or an automated verification module operating under predefined system rules. The agent 194 may receive a notification that a new relational update requires validation and may open a review panel showing the event data 180 and visual differences highlighted by the color coded system 184. The agent 194 may assess whether the new data aligns with client records or system constraints and may then perform an agent review 198 by approving or rejecting the modification. Upon completion of the agent review 198, the apparatus 100 may update the verification status 196 associated with the modified relationship. If the agent 194 confirms the change, the verification status 196 may change from "Pending Review" to "Approved," and the new version 190 (shown in green) may remain as the active record. If the agent 194 rejects the update, the processor 102 may revert the relationship to the previous version 186 (shown in gray) and flag the modification as "Rejected." The verification status 196 may also be displayed visually, such as by adding a checkmark icon next to approved updates or a warning icon next to those awaiting review. In another non-limiting example, the processor 102 may perform automated verification in parallel. For instance, if the artificial intelligence assistant 136 detects that a user 110 attempted to create a relationship type that conflicts with existing schema logic (such as linking a dependent as "Parent of" another dependent), the system may automatically reject the modification, mark the event as "Invalid Update," and record this decision in the verification log.

With continued reference to FIG. 1, the at least a processor 102 may be further configured to instantiate one or more event handlers, detect, using the one or more event handlers, input signals corresponding to node 118 selection, connection creation, and updates to one or more parameters 166 of the structured network 114, and execute, using the one or more event handlers, one or more operations in response to the detected input signals. As used in this disclosure, "input signal" is a digital or software-level instruction generated in response to a user interaction, system trigger, or automated process that is detected and interpreted by the apparatus 100. Each input signal represents an action or intent that initiates a change, update, or event within the structured network 114. The input signal may be generated when a user interacts with the graphical interface, such as by clicking, dragging, or typing, or when an automated component such as the artificial intelligence assistant 136 triggers a background update. In a non-limiting example, input signals may include "Create Node," "Update Relationship," "Select Task," or "Modify Role," each corresponding to a specific functional command handled by the processor 102 through event-driven architecture. As used in this disclosure, "node selection" is the process by which a user identifies and activates a specific node 118 within the interactive dashboard 162 for the purpose of viewing, editing, or performing actions on that node 118. Node 118 selection may generate an input signal that triggers the processor 102 to retrieve the associated data fields 140, relationships, and tasks 132 linked to that node 118. In a non-limiting example, when a user clicks on a node 118 representing "Mary Smith," the processor 102 may detect this node 118 selection event and display a contextual panel showing Mary Smith's attributes, including her role, relationships, and assigned tasks 132. The system may also highlight the selected node 118 visually, for example by outlining it in a bright color or displaying an expanded node 118 card, to indicate that it is active. As used in this disclosure, "connection creation" is the process by which a new relationship or linkage is established between two or more nodes 116 within the structured network 114. Connection creation may be initiated by a user 110 through the drag and drop feature 178, by an automated system event, or by a recommendation from the artificial intelligence assistant 136. Each connection creation event may generate an input signal that includes the source node 118, the target node 118, and the type of relationship to be established. In a non-limiting example, when a user 110 drags a connector from "Mary Smith" to "John Smith" and selects "Parent of" from a context menu, the processor 102 may interpret this action as a connection creation signal, instantiate the corresponding relational connection 172 within the data layer 174, and update the visualization in real time to display a new link between the two nodes 116. As used in this disclosure, "operation" is a computational or procedural action executed by the processor 102 in response to a detected input signal. Operations may include creating, updating, or deleting nodes 116, modifying relationships, adjusting parameters, or triggering system responses such as data synchronization or visualization refresh. Each operation may correspond to a defined function within the system's event-handling framework and may update both the interactive dashboard 162 and the underlying data layer 174 to maintain consistency. In a non-limiting example, an operation may include "Open Node Details Panel," "Save Relationship Update," "Propagate Data Change to Connected Clients," or "Trigger AI Recommendation." In a non-limiting example, the processor 102 may instantiate one or more event handlers to monitor and manage these input signals. Event handlers may be implemented as functions or listeners within the application controller that continuously observe user actions or system events. For instance, when a user clicks on a node 118, an event handler may detect the node 118 selection signal, retrieve the corresponding data object, and render the node's detailed information panel. If the user 110 subsequently creates a new connection, the event handler may detect the connection creation signal, validate it against schema rules, and execute the necessary operation to update the structured network 114 and refresh the visualization. In another non-limiting example, when a user modifies a node's parameter such as changing its role from "Dependent" to "Caregiver," the event handler may detect the update signal and initiate a series of operations including data validation, schema propagation, and real-time broadcasting to connected client interfaces. These operations may ensure that the updated parameter is stored in the data layer 174 and immediately reflected across all user sessions. In a further non-limiting example, the event handlers may operate asynchronously using technologies such as JavaScript Promises, WebSocket events, or Reactive programming frameworks like RxJS to ensure that multiple input signals can be processed concurrently without latency. For instance, while one event handler processes a connection creation signal, another may handle a visualization update or trigger an artificial intelligence recommendation operation.

With continued reference to FIG. 1, the at least a processor 102 may be further configured to execute the one or more operations by propagating the updates of the structured network 114 to the data layer 174, wherein the data layer 174 is configured to broadcast the updates to a plurality of connected client devices in real time. As used in this disclosure, "connected client device" is a computing device that is communicatively linked to the apparatus 100 and capable of displaying, receiving, or transmitting updates associated with the structured network 114. A connected client device may include, but is not limited to, desktop computers, laptop computers, tablets, smartphones, or web-enabled terminals operated by one or more users. Each connected client device may run a software application, web interface, or mobile dashboard that displays the structured network 114 and synchronizes with the data layer 174 to reflect the most current data. In a non-limiting example, connected client devices may include a financial advisor's workstation, a client's mobile application, and an administrator's browser session, all of which are simultaneously connected to the same structured family context and continuously updated through the data layer 174. As used in this disclosure, "real time" is a mode of data communication and system response in which updates, operations, and interactions are propagated, processed, and displayed with minimal delay perceptible to the user 110. Real time operation enables all connected client devices to remain synchronized such that any change made on one device is immediately reflected on all others. In a non-limiting example, real time communication may be achieved through technologies such as WebSockets, server-sent events, or publish-subscribe architectures that allow instant broadcasting of data changes. In a non-limiting example, when a user 110 adds a new node 118 representing "John Smith" on a connected client device, such as a financial advisor's computer, the processor 102 may execute an operation to propagate this update to the data layer 174. The data layer 174 may record the new node 118, its parameters, and relationships, and then broadcast the update to all other connected client devices. In response, a client's mobile dashboard and an administrative portal may both display the new node 118 within the structured network 114 in real time, showing an updated visualization that includes John Smith's relationships and role attributes without requiring manual refresh or synchronization. In another non-limiting example, when a user 110 modifies a relationship on one device, such as changing a connection from "Dependent of" to "Caregiver of," the processor 102 may detect this modification, transmit the updated parameters to the data layer 174, and trigger a broadcasting event. The data layer 174 may then push this change to all connected clients through real time streaming channels. Users viewing the structured network 114 on other devices may see the connection line between the affected nodes 116 instantly update in color, label, or configuration, indicating that the relationship has changed. In another non-limiting example, the real time data propagation process may include concurrency management and version control logic to ensure data integrity. If multiple users attempt to modify the same node 118 simultaneously from different connected client devices, the data layer 174 may apply conflict resolution rules, such as prioritizing the latest verified input or requiring agent 194 confirmation, before broadcasting the final state to all devices. In another non-limiting example, the apparatus 100 may use a data synchronization framework such as Convex, Firebase Realtime Database, or Redis Streams to manage real time broadcasting. These systems may maintain persistent connections with all active clients and deliver updates in under a second, ensuring continuous alignment between user interfaces and backend data.

Figure 2:
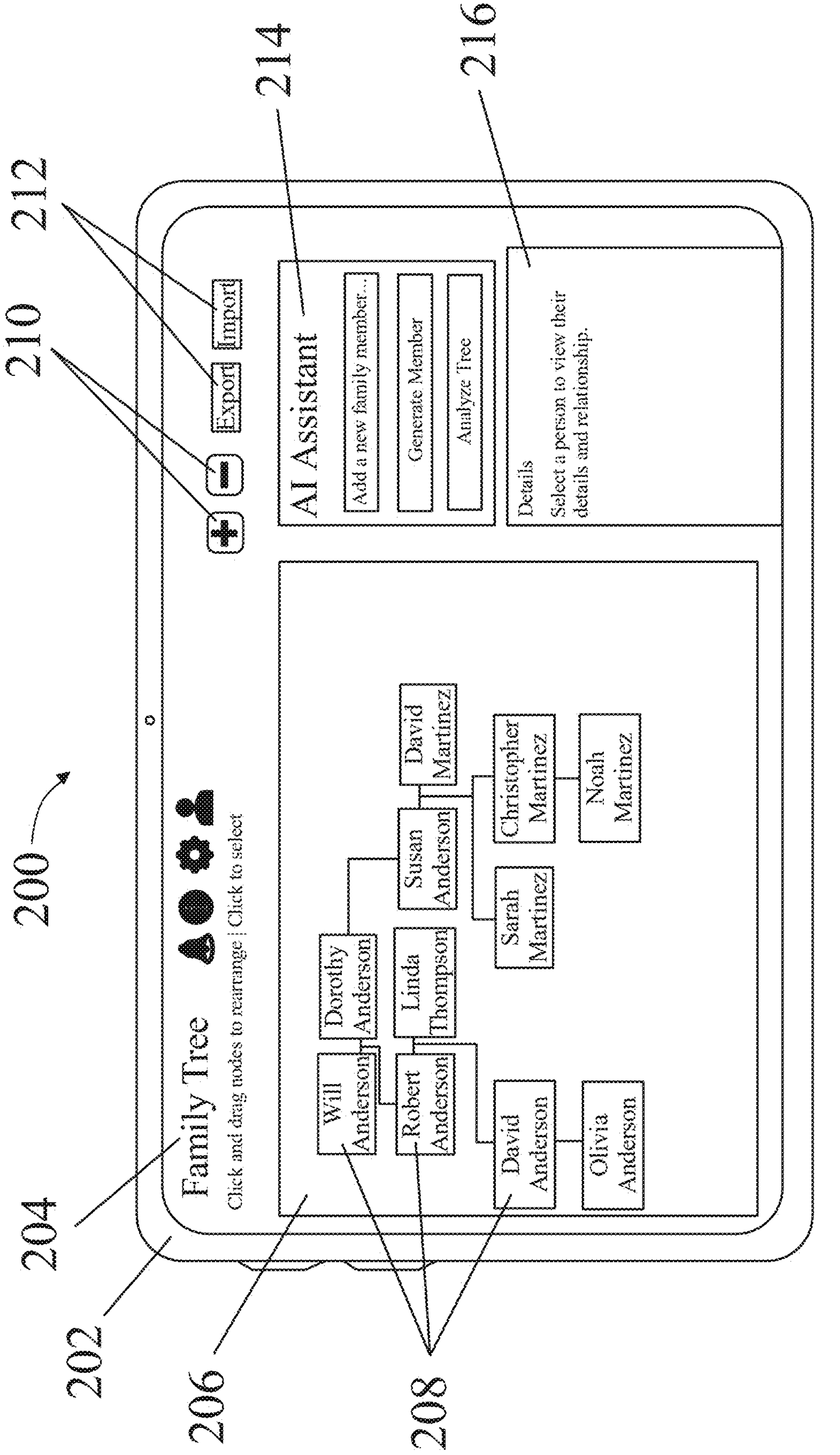
FIG. 2 is an exemplary illustration of a graphical user interface.

Referring now to FIG. 2, an exemplary illustration 200 of a graphical user interface is shown. In an embodiment, the illustration 200 may include a client device 202. Without limitation, the client device 202 is a computing device as defined in FIG. 1 and may include a display, a processor, a memory, and communication interfaces configured to execute the interactive dashboard and render the structured network. The client device 202 may be implemented as a desktop computer, laptop computer, tablet, or mobile device capable of connecting to the data layer and synchronizing in real time with other connected client devices. In an embodiment, the illustration 200 may include a header 204. Without limitation, the header 204 is a top navigation and control element that may display the title "Family Tree" along with system icons representing settings, notifications, or user management tools. The header 204 may serve as an access point for initiating application-level operations, such as returning to a main menu, opening configuration dialogs, or invoking user-specific actions managed by the application controller. In an embodiment, the illustration 200 may include an interactive window 206. Without limitation, the interactive window 206 is a graphical workspace that allows a user to view, manipulate, and edit a structured family context. The interactive window 206 may include an interactive canvas where the structured network is displayed, enabling actions such as selecting, dragging, and connecting nodes, as well as invoking contextual menus to modify parameters of the structured network. In an embodiment, the illustration 200 may include a network comprising nodes 208. Without limitation, the nodes 208 are visual and interactive representations of entities within the structured family context, such as family members or associated participants. Each node may display identifying information such as a name, role, or relationship type. In a non-limiting example, the nodes 208 may include entities such as "Will Anderson," "Dorothy Anderson," or "Susan Anderson," each represented as a clickable element that may display additional data or relationship details upon selection. The network comprising nodes 208 may visually depict interconnections such as parent-child, sibling, or spouse relationships and may update dynamically as the user modifies family relationships or adds new entities. In an embodiment, the illustration 200 may include interactive buttons 210. Without limitation, the interactive buttons 210 are user interface elements configured to receive user input 138 for performing predefined actions within the structured network. The interactive buttons 210 may include graphical icons such as a "plus" sign for adding a new node, a "gear" symbol for configuration settings, or a "user" symbol for accessing profile information. Each interactive button may trigger event handlers managed by the processor 102 to perform corresponding operations, such as opening input dialogs, executing commands, or updating the visualization in real time. In an embodiment, the illustration 200 may include Export and Import buttons 212. Without limitation, the Export and Import buttons 212 are interactive controls that enable a user to exchange data between the structured network and external systems. The Export button may allow a user to save or transmit structured data, such as a family tree or client record, to a designated file format or connected service. The Import button may allow the user to retrieve and load structured data from an external database, client management system, or data file. In a non-limiting example, a user may export a family tree as a JSON or CSV file for offline analysis, or import household data from an external contact management platform. In an embodiment, the illustration 200 may include an artificial intelligence assistant 214. Without limitation, the artificial intelligence assistant 214 is the intelligent automation component as defined in FIG. 1 and may be configured to analyze the structured network, suggest new or updated records, and assist with data generation or validation. The artificial intelligence assistant 214 may include interactive controls such as "Add a new family member," "Generate Member," and "Analyze Tree," which may trigger machine learning processes to populate or refine the structured network. In an embodiment, the illustration 200 may include a details section 216. Without limitation, the details section 216 is an information display panel configured to present detailed attributes and relationship data corresponding to a selected node within the structured network. When a user selects a family member or entity, the details section 216 may display contextual information such as roles, relationships, tasks, verification status, or historical changes. The details section 216 may also allow direct editing of node parameters and may communicate with the data layer to ensure that updates are reflected in real time across all connected client devices.

Figure 3:
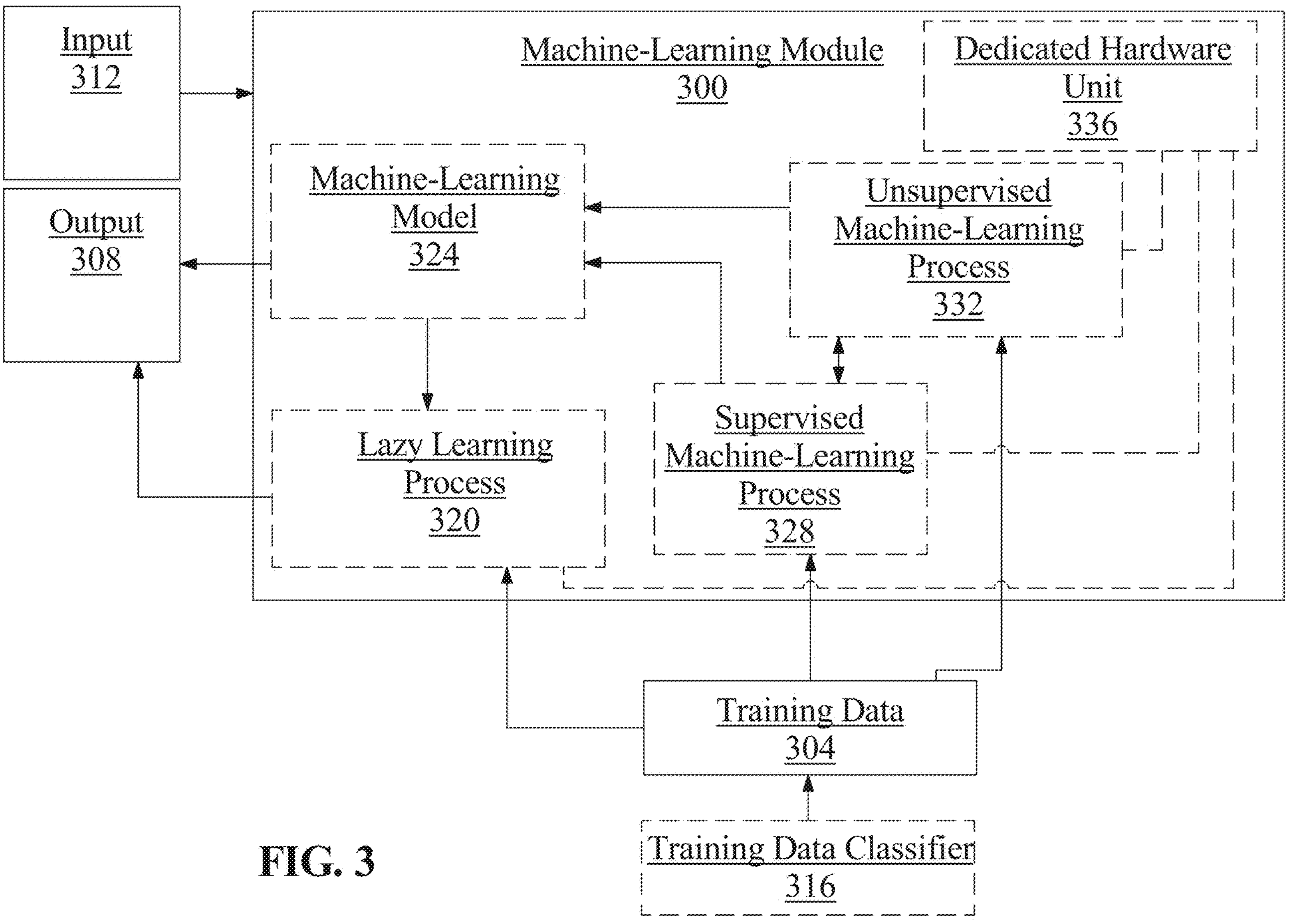
FIG. 3 is a block diagram of an exemplary machine-learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, the input data may include structured and unstructured information such as demographic attributes, relationship metadata, behavioral indicators, and interaction histories associated with entities within the structured family context. For instance, input data may comprise features such as age, household role, relationship type, financial activity level, task completion frequency, or communication patterns extracted from user interactions, client records, or third-party data integrations. The output data may include one or more predictive or classified outcomes generated by the machine learning module 300, such as role classification, relationship inference, task prioritization, or verification status prediction.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, the training data classifier 316 may classify elements of the training data to characterize a sub-population such as a cohort of related entities, individuals, or contextual groupings that share common attributes or behavioral patterns. The sub-population may represent a logical or functional subset of the structured network for which targeted model training or analysis is performed. In a non-limiting example, the training data classifier 316 may categorize training data into cohorts such as "multi-generational households," "high-frequency communication clusters," "financially interdependent members," or "caregiver-dependent pairs."

Still referring to FIG. 3, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}:X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include input examples such as age, relationship type, and communication frequency as inputs, and output examples such as predicted role classifications, inferred relationships, or verification statuses as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including, without limitation, support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
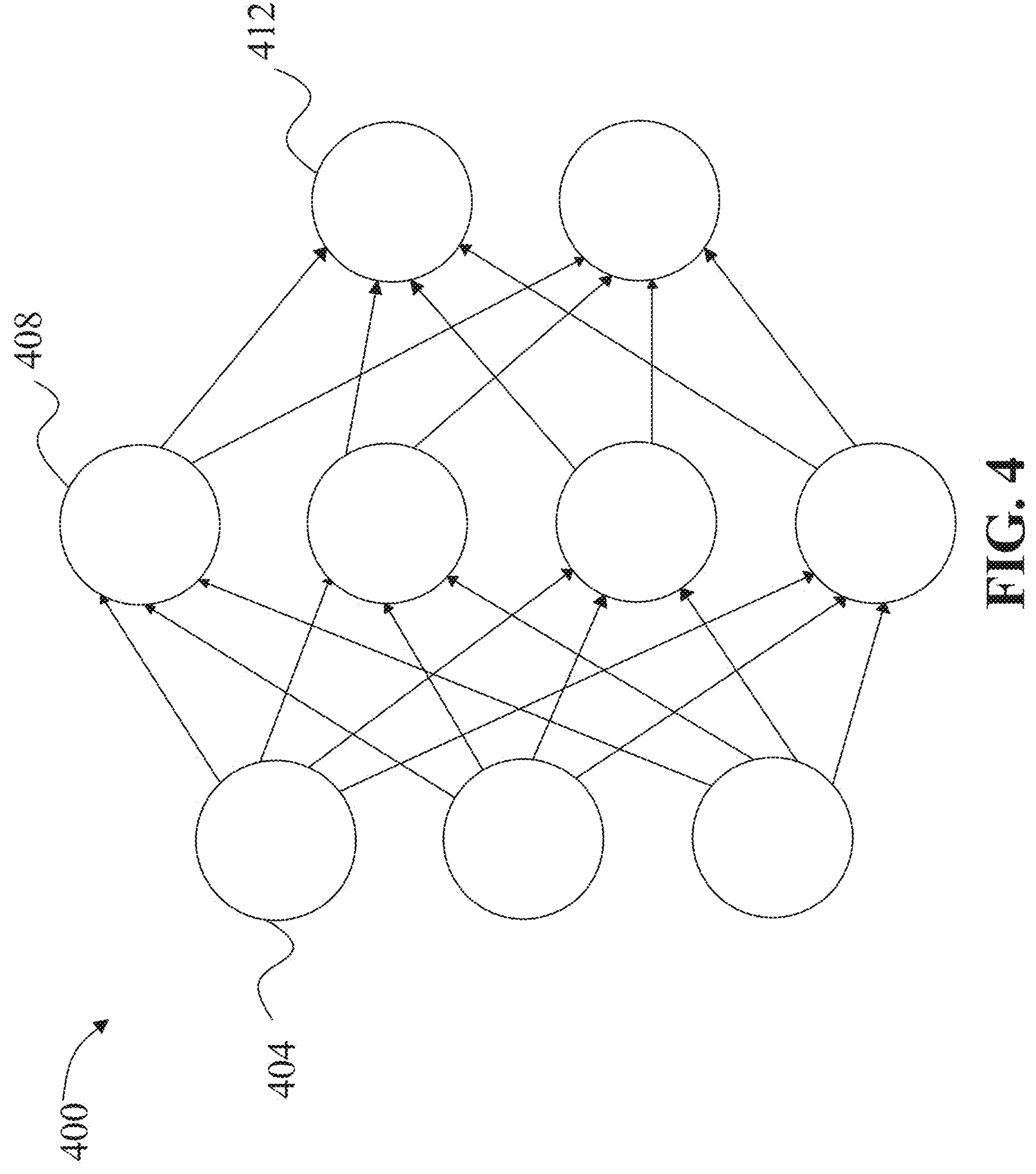
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
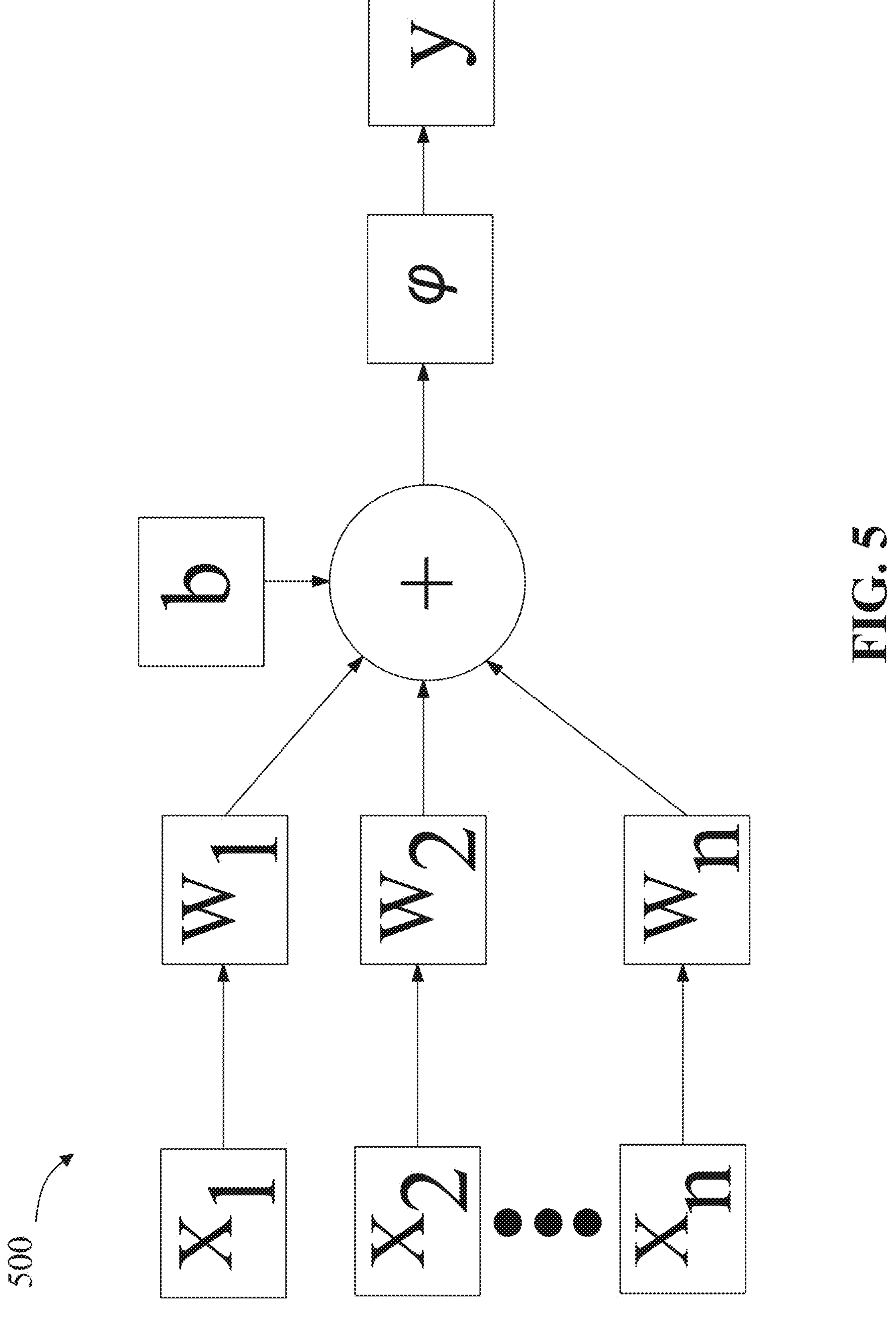
FIG. 5 is a diagram of an exemplary embodiment of a node of a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}} \text{ given}$$

input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}.$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
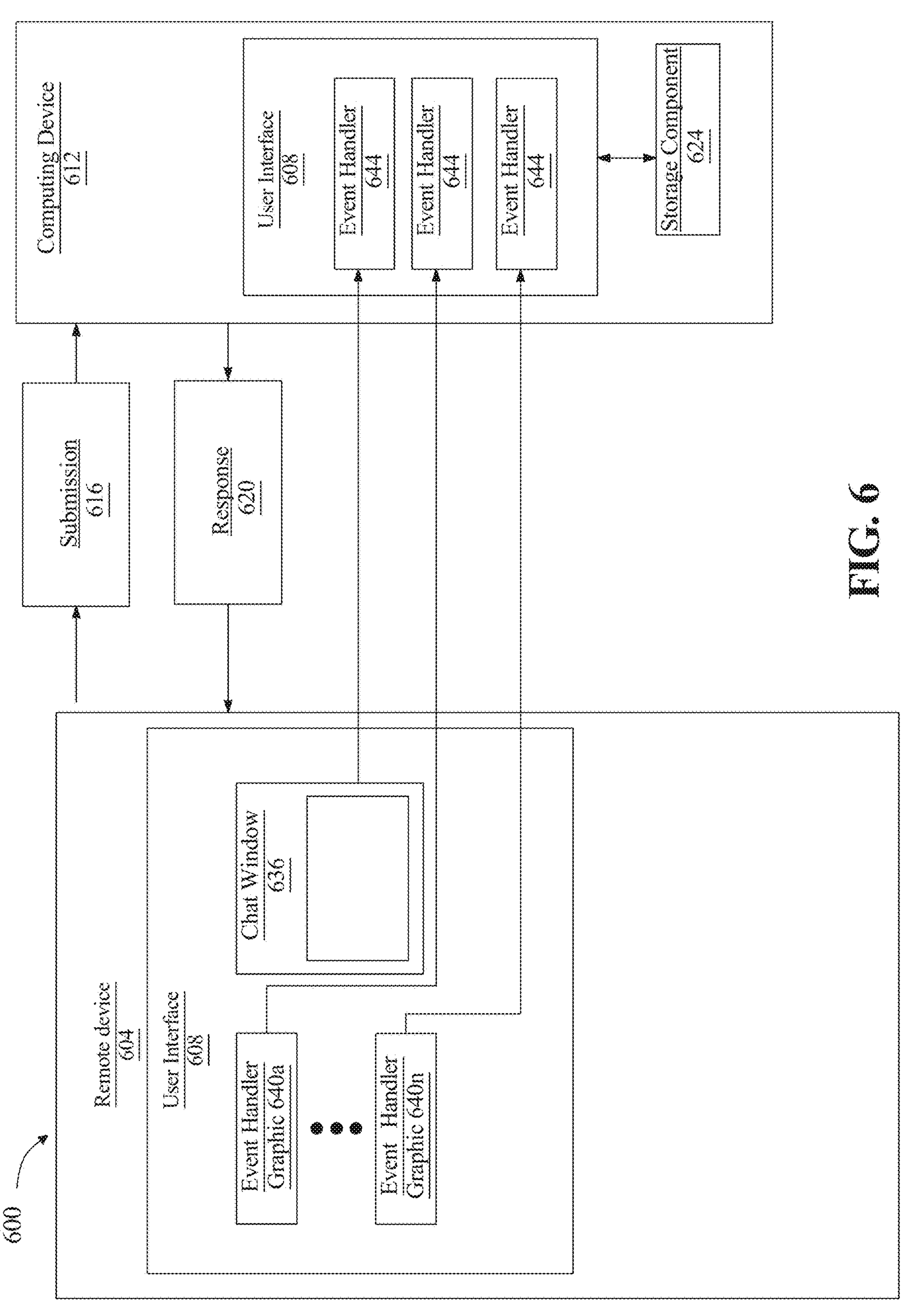
FIG. 6 is a schematic of a chatbot system.

Referring now to FIG. 6, a user interface system 600 is schematically illustrated. User interface system 600 may configure a computing device 612 to configure a remote device 604 to perform display, input, and output functions, without limitation of a user interface. According to some embodiments, a user interface 608 may be communicative with a computing device 612, such as computing device as described above, that is configured to operate a chatbot. In some cases, user interface 608 may be local to computing device 612. Alternatively or additionally, in some cases, user interface 608 may remote to computing device 612 and communicative with the computing device 612, by way of one or more networks, such as without limitation the internet. Alternatively or additionally, user interface 608 may communicate with user device using telephonic devices and networks, such as without limitation fax machines, short message service (SMS), or multimedia message service (MMS). Commonly, user interface 608 communicates with computing device 612 using text-based communication, for example without limitation using a character encoding protocol, such as American Standard for Information Interchange (ASCII). Textual communication may be made between two or more users operating user devices, each of which may be configured by computing device to implement user interface. Two or more users may communicate with one another via user interface instances; alternatively or additionally, user interface 608 may conversationally interface using a chatbot, by way of at least a submission 616, from the user interface 608 to the chatbot, and a response 620, from the chatbot to the user interface 608. In many cases, one or both of submission 616 and response 620 are text-based communication. Alternatively or additionally, in some cases, one or both of submission 616 and response 620 are audio-based communication.

Continuing in reference to FIG. 6, a submission 616 once received by computing device 612 operating a chatbot, may be processed by circuitry and/or a processor, for instance and without limitation as described above. In some embodiments, processor processes a submission 616 using one or more of keyword recognition, pattern matching, and natural language processing. In some embodiments, processor employs real-time learning with evolutionary algorithms. In some cases, processor may retrieve a pre-prepared response from at least a storage component 624, based upon submission 616. Alternatively or additionally, in some embodiments, processor communicates a response 620 without first receiving a submission 616, thereby initiating conversation. Alternatively or additionally, processor may input user-submitted or other text as an input and may output a textual response using one or more generative artificial intelligence processes and/or components, such as without limitation an LLM or other generative model as described above. In some cases, processor communicates an inquiry to user interface 608; and the processor is configured to process an answer to the inquiry in a following submission 616 from the user interface 608. In some cases, an answer to an inquiry present within a submission 616 from a user device may be used by computing device 612 as an input to another function; inputs may include without limitation, composition data, pecuniary goal data, data suitable for use as survey data, or the like. Inputs generated by a chatbot may be input, without limitation, to any process, module, component, or other element described in this disclosure that can accept an input.

Still referring to FIG. 6, apparatus may, for instance, use a client-side program to configure a user device to display data and/or to perform event handling of user inputs; such display may be implemented, without limitation, as a graphical user interface. For instance, and without limitation, apparatus may display any output of any authentication process, any output of computation of predicted message, any output of any process used in computation of predicted message, any output of any authorization process, and/or any output of processes used to perform authorization. Apparatus and/or circuitry may configure a user device to display one or more event handler graphics 640*a-n*. As used in this disclosure, an "event handler graphic" is a graphical element with which a user of remote device may interact to enter data, for instance and without limitation for a search query or the like as described in further detail below. An event handler graphic 640*a-n* may include, without limitation, a button, a link, a checkbox, a text entry box and/or window, a drop-down list, a slider, or any other event handler graphic 640*a-n* that may occur to a person skilled in the art upon reviewing the entirety of this disclosure. As previously defined, the event handler may include a module, data structure, function, and/or routine that performs an action on remote device in response to a user interaction with event handler graphic 640*a-n*. For instance, and without limitation, an event handler 644 may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler 644 may generate prompts for further information, may compare data to validation rules such as requirements that the data in question be entered within certain numerical ranges, and/or may modify data and/or generate warnings to a user in response to such requirements. Event handler 644 may convert data into expected and/or desired formats, for instance such as date formats, currency entry formats, name formats, or the like. Event handler 644 may transmit data from remote device to apparatus and/or circuitry.

In an embodiment, and further referring to FIG. 1, event handler 644 may include a cross-session state variable. As used herein, a "cross-session state variable" is a variable recording data entered on remote device during a previous session. Such data may include, for instance, previously entered text, previous selections of one or more elements as described above, or the like. For instance, cross-session state variable data may represent a search a user entered in a past session. Cross-session state variable may be saved using any suitable combination of client-side data storage on remote device and server-side data storage on apparatus and/or circuitry; for instance, data may be saved wholly or in part as a "cookie" which may include data or an identification of remote device to prompt provision of cross-session state variable by apparatus and/or circuitry, which may store the data on apparatus and/or circuitry. Alternatively, or additionally, apparatus and/or circuitry may use login credentials, device identifier, and/or device fingerprint data to retrieve cross-session state variable, which apparatus and/or circuitry may transmit to remote device. Cross-session state variable may include at least a prior session datum. A "prior session datum" may include any element of data that may be stored in a cross-session state variable. Event handler graphic 640*a-n* may be further configured to display the at least a prior session datum, for instance and without limitation auto-populating user query data from previous sessions.

With continued reference to FIG. 6, in one or more embodiments, users may utilize instances of user interface system 600 to exchange text messages with each other. User interface 608 may include functionality to configure each or any remote device to display a chat window 636. A chat window 636 may include a window or field that displays text generated by one or more users and/or chatbot outputs, and/or a window or field for entry of textual data by a user; windows and/or fields for display and entry may be separate. An event handler graphic 640*a-n* and/or event handler 644 may transmit textual entries and/or display such entries, for instance and without limitation when a user "posts" such entries to make them visible to a chatbot and/or another user.

Referring now to FIG. 7, a flow diagram of an exemplary method 700 for generating an interactive dashboard is illustrated. At step 705, method 700 includes receiving, using at least a processor, input data comprising a user profile associated with a user. This may be implemented as described and with reference to FIGS. 1-6.

Still referring to FIG. 7, at step 710, method 700 includes generating, using the at least a processor and a machine learning model, a structured network as a function of the input data, wherein the structured network comprises a plurality of nodes, each node associated with an entity of a plurality of entities, and wherein generating the structured network comprises classifying each node into one or more categories as a function of feature vectors extracted from the input data and entity parameters representing interconnections among the plurality of entities, assigning each node to one or more tasks as a function of the classification, and updating the assignment as a function of supplemental data. In an embodiment, the at least a processor may be further configured to receive, using an artificial intelligence assistant, the input data, wherein the input data comprises user input and populate one or more fields of the structured network with the user input. In an embodiment, the at least a processor may be further configured to recommend, using the artificial intelligence assistant, minimum data required for the structured network and verify the minimum data recommended by the artificial intelligence assistant as a function of feedback. In an embodiment, the at least a processor may be further configured to assign each node a permission level as a function of a predefined protocol. In an embodiment, the at least a processor may be further configured to train the machine learning model on training data comprising labeled feature vectors and labeled relational parameters extracted from historical structured networks. In an embodiment, the at least a processor may be further configured to adjust weighting parameters of the machine learning model as a function of verified node classifications. This may be implemented as described and with reference to FIGS. 1-6.

Still referring to FIG. 7, at step 715, method 700 includes generating, using the at least a processor, an interactive dashboard comprising the structured network, wherein generating the interactive dashboard comprises receiving user input events to modify one or more parameters of the structured network and rendering, in response to the user input events, a dynamic visualization of the structured network comprising updated node states and relational connections that are synchronized with a data layer. In an embodiment, the at least a processor may be further configured to generate interactive interface elements, wherein the interactive interface elements are configured to provide a drag and drop feature for defining the relational connections of each node. In an embodiment, the at least a processor may be further configured to log event data associated with modifications of the structured network, display the modifications of the structured network with a color coded system, wherein a previous version is associated with a first color and a new version is associated with a second color, verify the modifications of the structured network using an agent, and display a verification status as a function of an agent review associated with the agent. In an embodiment, the at least a processor may be further configured to instantiate one or more event handlers, detect, using the one or more event handlers, input signals corresponding to node selection, connection creation, and updates to one or more parameters of the structured network, and execute, using the one or more event handlers, one or more operations in response to the detected input signals. In an embodiment, the at least a processor may be further configured to execute the one or more operations by propagating the updates of the structured network to the data layer, wherein the data layer is configured to broadcast the updates to a plurality of connected client devices in real time. This may be implemented as described and with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
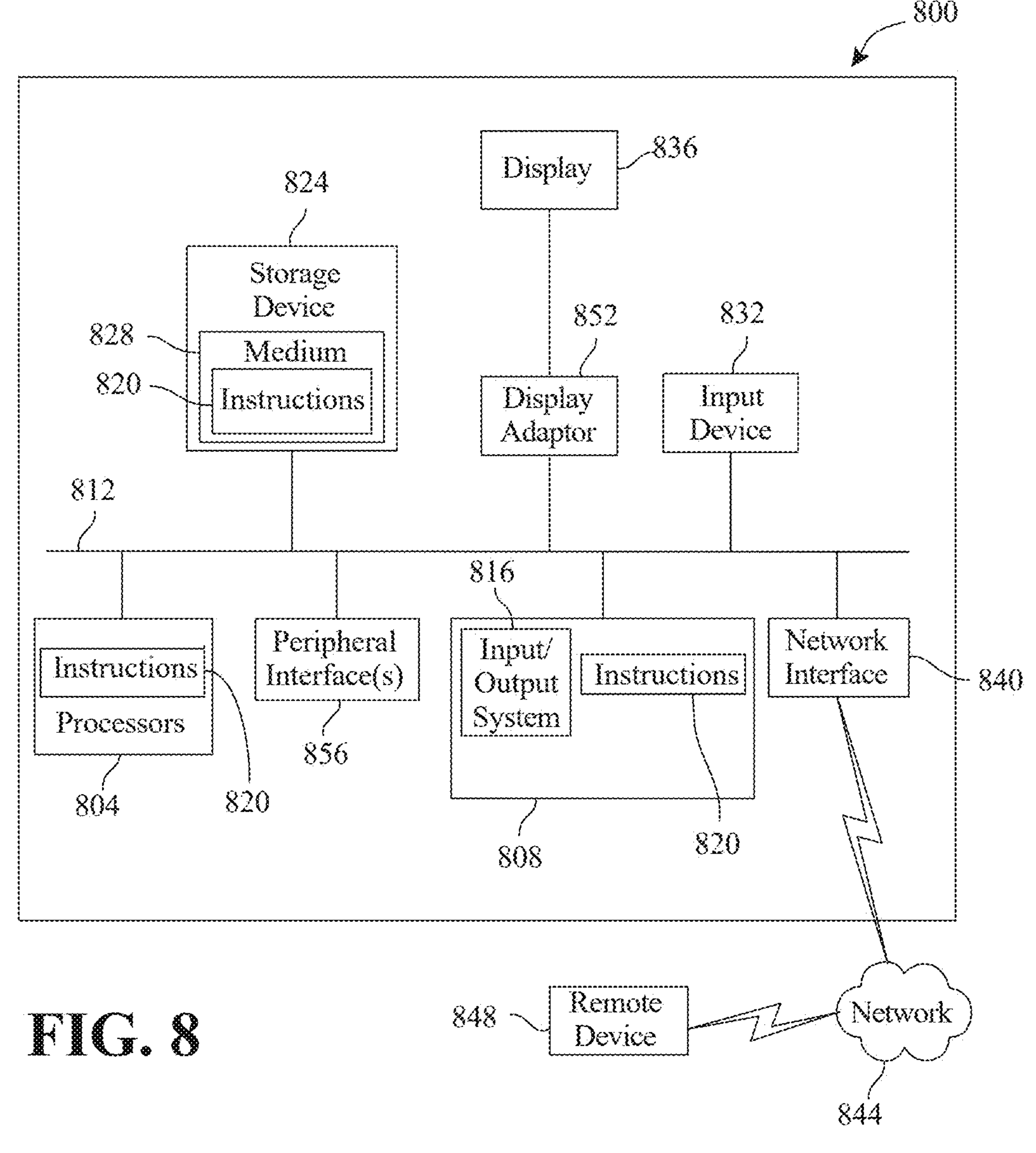
FIG. 8 is a block diagram of a computing system that can be used to implement any one or more of the methodologies disclosed herein and any one or more portions thereof.

FIG. 8 shows a diagrammatic representation of one embodiment of computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display device 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

Figure 9:
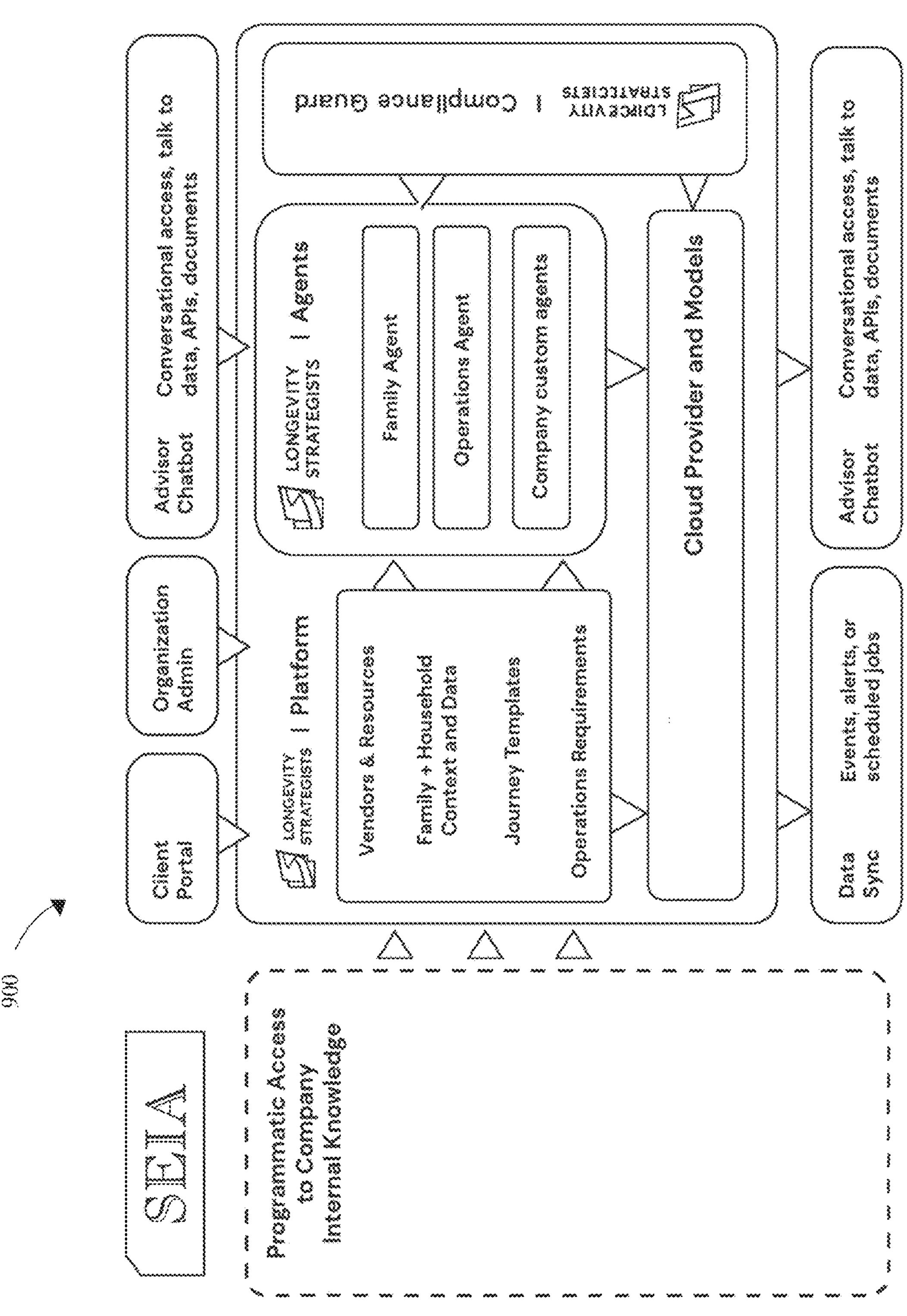
FIG. 9 illustrates a block diagram of a multi-layer artificial intelligence system.

Referring to FIG. 9, an exemplary diagram 900 of a multi-layer artificial intelligence system is illustrated. An exemplary diagram 900 illustrates a high-level architectural view of an enterprise-integrated artificial intelligence platform configured to operate within regulated environments such as financial advisory and professional services. Diagram 900 depicts the manner in which multiple subsystems, including enterprise data sources, a core platform layer, specialized artificial-intelligence agents, cloud-based model execution environments, and a compliance guard, interoperate to provide secure, context-aware, and regulation-aligned AI functionality.

With continued reference to FIG. 9, diagram 900 includes a programmatic access layer disposed on the left side of the figure. In some embodiments, the programmatic access layer may include secure connectors, ingestion pipelines, and authenticated APIs configured to retrieve enterprise data from internal systems such as meeting systems, messaging systems, planning platforms, and account-management tools. As described in the due diligence materials, such data ingestion may occur via SOC-2-aligned interfaces using encryption, access controls, and identity-management mechanisms such as Single Sign-On (SSO). These programmatic interfaces allow the system to access and synchronize structured and unstructured data across corporate applications including meetings, emails, SMS messages, advisor notes, plans, and account information.

With continued reference to FIG. 9, diagram 900 further includes a core platform layer that functions as the chassis upon which downstream agents operate. In some embodiments, the core platform layer may include vendor and resource repositories, a family and household context model, journey templates, and operational and compliance requirements. The family and household context model may represent multi-person household structures, relationships among household members, life-stage attributes, caregiving contexts, and temporal events, enabling AI agents to reason about a system of individuals rather than a single client. Journey templates may define sequenced processes tailored to client needs, such as retirement transitions, caregiving events, or financial-planning workflows. Operational requirements may include firm-specific procedures, regulatory rules, and compliance-guardrails. This platform layer may form the "canvas" upon which all agents perform reasoning tasks, ensuring that AI outputs remain aligned with institutional processes and household-level context.

With continued reference to FIG. 9, diagram 900 also illustrates a multi-agent layer comprising a plurality of specialized agents, such as a family agent, an operations agent, and one or more enterprise-specific custom agents. In some embodiments, the family agent may evaluate family-context data and provide personalized insights relating to household dynamics, care-coordination needs, or vulnerability indicators. The operations agent may evaluate advisor actions or client requests against internal procedures and regulatory constraints. Custom agents may enable firms to encode proprietary reasoning processes or domain-specific expertise. The system may be intentionally designed to support multiple agents operating concurrently over the same contextual dataset, allowing more robust and auditable decision-making than a monolithic model.

With continued reference to FIG. 9, diagram 900 includes a compliance guard subsystem positioned adjacent to the multi-agent layer. In some embodiments, the compliance guard subsystem may enforce role-based access control, validate outbound language-model requests, redact sensitive data, block non-permissible content, and ensure that agents do not violate regulatory constraints or modify enterprise data without explicit authorization. The due diligence questionnaire highlights internal controls such as audit logging, encryption, incident-response policies, third-party risk frameworks, and access-review cycles, all of which may be enforced or integrated into the compliance guard subsystem. This subsystem is architecturally independent from the agents and serves as a non-bypassable security and compliance layer, ensuring technical safeguards rather than policy-level guidance alone.

With continued reference to FIG. 9, diagram 900 further includes a cloud provider and model execution layer, which may utilize infrastructure. In some embodiments, this cloud layer may host large language models, vector search engines, agent orchestration tools, and scheduled compute jobs. The system may rely on cloud-provider services for secure execution of model inference, credential-isolated API access, and scaling of computational workloads. As described in the due diligence documentation, the cloud layer may implement SOC-2-aligned security controls including vulnerability scanning, network segmentation, and multi-factor authentication.

With continued reference to FIG. 9, diagram 900 also includes several user-facing interfaces, such as a client portal, an organization-administration console, and an advisor chatbot. In some embodiments, the advisor chatbot may provide conversational access to enterprise knowledge, household context, and compliant operational workflows. The client portal may present adaptive journeys and context-appropriate information to end users. The organization-administration console may permit enterprise users to manage custom agents, resource libraries, compliance configurations, and operational rules. Role-based permissions, as noted in the due diligence materials, may govern access to each interface to ensure that users interact only with authorized system components.

With continued reference to FIG. 9, the system and methods depicted therein may be integrated into, and operate in coordination with, the functions of apparatus 100 described with respect to FIG. 1 to enhance privacy-preserving control over sensitive textual input. For example, the detection, masking, and visual-indicator logic described with respect to FIG. 9 may be incorporated directly into processor and its associated processing schemes so that the visual state transitions, highlighting events, and GUI-level masking behaviors illustrated in FIG. 9 serve as the user-facing manifestation of an underlying redaction pipeline. As used in this disclosure, a "redaction pipeline" is a sequence of computational operations executed by the processor that detects sensitive textual elements, applies masking or transformation rules to those elements, and generates corresponding visual indicators so that the graphical interface accurately reflects each redaction event in real time. In such embodiments, visual indicator generation described with respect to FIG. 9, event flow management, and interface-update routines may be executed as part of the same cascading sequence used to detect processing elements, thereby enabling real-time rendering of highlights, mask placeholders, or warning icons whenever a processing scheme identifies a sensitive segment within textual input.

With continued reference to FIG. 9, the system may further be used to implement the display-level behaviors, including locking and unlocking the text input field, suspending keystroke processing, synchronizing unmasked and masked views, and presenting interactive visual cues corresponding to applied data masks. As used in this disclosure, "display-level behaviors" are interface-level actions performed by a graphical user interface to visually represent, control, or update how textual input is shown to a user during processing or masking operations. As used in this disclosure, "locking and unlocking the text input field" is a process in which the system temporarily disables or re-enables user editing within a text field to prevent or allow further input while sensitive-data processing is occurring. As used in this disclosure, "suspending keystroke processing" is a temporary halt in interpreting or transmitting user keystrokes so that no new characters are accepted or sent for processing until a masking or verification event is completed. As used in this disclosure, "synchronizing unmasked and masked views" is a coordinated update mechanism in which the system maintains parallel representations of the same text, one fully visible and one redacted, so that changes in one representation are accurately reflected in the other. As used in this disclosure, "presenting interactive visual cues corresponding to applied data masks" is the act of displaying icons, highlights, tooltips, or other graphical indicators that notify the user when specific segments of text have been masked and allow user interaction with those indicators. For example, when processor detects a processing element and applies a data mask, interface logic is described with respect to FIG. 9 may immediately annotate the corresponding region using color-coding, hover tooltips, or categorical icons to signal the masking event. Similarly, GUI-driven confirmation workflow described with respect to FIG. 9 may be employed as the mechanism through which processed textual input is displayed for user verification prior to routing to external system. In this manner, the operational processes of FIG. 1, particularly identification, masking, classification, and completion of cascading sequence, may be complemented by detailed user-interface mechanisms described with respect to FIG. 9, ensuring that every internal privacy-filtering action is transparently communicated to the user through consistent, real-time visual indicators.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating an interactive dashboard, wherein the apparatus comprises:

at least a computing device, wherein the at least a computing device comprises:

a memory; and at least a processor communicatively connected to the memory, wherein the memory contains instructions configuring the at least a processor to:

receive input data comprising a user profile associated with a user;

generate, using a machine learning model, a structured network as a function of the input data, wherein the structured network comprises a plurality of nodes, each node associated with an entity of a plurality of entities, wherein generating the structured network comprises:

classifying each node into one or more categories as a function of feature vectors extracted from the input data and entity parameters representing interconnections among the plurality of entities;

assigning each node to one or more tasks as a function of the classification, wherein the classification defines a node state associated with each node, the node state comprising classification, active tasks, and verification status;

updating the assignment as a function of supplemental data by modifying both the active tasks and the verification status of the node state; and storing, in memory, attributes and relationships associated with each node for subsequent retrieval and visualization, wherein the stored attributes and relationships enables querying of relationships and real-time synchronization between a data layer and a visual interface; and generate, as a function of the node state, an interactive dashboard comprising the structured network, wherein generating the interactive dashboard comprises:

receiving user input events to modify one or more parameters of the structured network; and rendering, in response to the user input events, a dynamic visualization of the structured network comprising updated node states, including the classification, active tasks, and verification status associated with each node, and relational connections that are synchronized with a data layer.

2. The apparatus of claim 1, wherein the at least a processor is further configured to:

receive, using an artificial intelligence assistant, the input data, wherein the input data comprises user input; and populate one or more fields of the structured network with the user input.

3. The apparatus of claim 2, wherein the at least a processor is further configured to:

recommend, using the artificial intelligence assistant, minimum data required for the structured network; and verify the minimum data recommended by the artificial intelligence assistant as a function of feedback.

4. The apparatus of claim 1, wherein the at least a processor is further configured to:

generate interactive interface elements, wherein the interactive interface elements are configured to provide a drag and drop feature for defining the relational connections of each node.

5. The apparatus of claim 1, wherein the at least a processor is further configured to:

assign each node a permission level as a function of a predefined protocol.

6. The apparatus of claim 1, wherein the at least a processor is further configured to:

log event data associated with modifications of the structured network;

display the modifications of the structured network with a color coded system, wherein a previous version is associated with a first color and a new version is associated with a second color;

verify the modifications of the structured network using an agent; and display a verification status as a function of an agent review associated with the agent.

7. The apparatus of claim 1, wherein the at least a processor is further configured to train the machine learning model on training data comprising labeled feature vectors and labeled relational parameters extracted from historical structured networks.

8. The apparatus of claim 1, wherein the at least a processor is further configured to:

instantiate one or more event handlers;

detect, using the one or more event handlers, input signals corresponding to node selection, connection creation, and updates to one or more parameters of the structured network; and execute, using the one or more event handlers, one or more operations in response to the detected input signals.

9. The apparatus of claim 8, wherein the at least a processor is further configured to execute the one or more operations by:

propagating the updates of the structured network to the data layer, wherein the data layer is configured to broadcast the updates to a plurality of connected client devices in real time.

10. The apparatus of claim 1, wherein the at least a processor is further configured to adjust weighting parameters of the machine learning model as a function of verified node classifications.

11. A method of generating an interactive dashboard, wherein the method comprises:

receiving, using at least a processor, input data comprising a user profile associated with a user;

generating, using the at least a processor and a machine learning model, a structured network as a function of the input data, wherein the structured network comprises a plurality of nodes, each node associated with an entity of a plurality of entities, and wherein generating the structured network comprises:

classifying each node into one or more categories as a function of feature vectors extracted from the input data and entity parameters representing interconnections among the plurality of entities;

assigning each node to one or more tasks as a function of the classification, wherein the classification defines a node state associated with each node, the node state comprising classification, active tasks, and verification status;

updating the assignment as a function of supplemental data by modifying both the active tasks and the verification status of the node state; and storing, in memory, attributes and relationships associated with each node for subsequent retrieval and visualization, wherein the stored attributes and relationships enables querying of relationships and real-time synchronization between a data layer and a visual interface; and generating, using the at least a processor, as a function of the node state, an interactive dashboard comprising the structured network, wherein generating the interactive dashboard comprises:

receiving user input events to modify one or more parameters of the structured network; and rendering, in response to the user input events, a dynamic visualization of the structured network comprising updated node states, including the classification, active tasks, and verification status associated with each node, and relational connections that are synchronized with a data layer.

12. The method of claim 11, further comprising:

receiving, using an artificial intelligence assistant, the input data, wherein the input data comprises user input; and populating, using the at least a processor, one or more fields of the structured network with the user input.

13. The method of claim 12, further comprising:

recommending, using the artificial intelligence assistant, minimum data required for the structured network; and verifying, using the at least a processor, the minimum data recommended by the artificial intelligence assistant as a function of feedback.

14. The method of claim 11, further comprising:

generating, using the at least a processor, interactive interface elements, wherein the interactive interface elements are configured to provide a drag and drop feature for defining the relational connections of each node.

15. The method of claim 11, further comprising:

assigning, using the at least a processor, each node a permission level as a function of a predefined protocol.

16. The method of claim 11, further comprising:

logging, using the at least a processor, event data associated with modifications of the structured network;

displaying, using the at least a processor, the modifications of the structured network with a color coded system, wherein a previous version is associated with a first color and a new version is associated with a second color;

verifying, using the at least a processor, the modifications of the structured network using an agent; and displaying, using the at least a processor, a verification status as a function of an agent review associated with the agent.

17. The method of claim 11, further comprising training, using the at least a processor, the machine learning model on training data comprising labeled feature vectors and labeled relational parameters extracted from historical structured networks.

18. The method of claim 11, further comprising:

instantiating, using the at least a processor, one or more event handlers;

detecting, using the one or more event handlers, input signals corresponding to node selection, connection creation, and updates to one or more parameters of the structured network; and executing, using the one or more event handlers, one or more operations in response to the detected input signals.

19. The method of claim 18, further comprising executing, using the at least a processor, the one or more operations by:

propagating the updates of the structured network to the data layer, wherein the data layer is configured to broadcast the updates to a plurality of connected client devices in real time.

20. The method of claim 11, further comprising adjusting, using the at least a processor, weighting parameters of the machine learning model as a function of verified node classifications.

* * * * *